United States Patent [19]
Janssen, Jr. et al.

[11] Patent Number: 5,376,217
[45] Date of Patent: Dec. 27, 1994

[54] APPLICATION OF IDENTIFYING INDICIA

[75] Inventors: Alexander P. Janssen, Jr., Charlottesville; Samuel A. Loyd, Jr., Waynesboro; Timothy L. Worley, Barboursville, all of Va.

[73] Assignee: VAS of Virginia, Inc., Charlottesville, Va.

[21] Appl. No.: 843,418

[22] Filed: Feb. 27, 1992

[51] Int. Cl.5 ............................................. B32B 31/00
[52] U.S. Cl. ................................. 156/361; 156/363; 156/542
[58] Field of Search .................. 156/64, 361, 362, 363, 156/542, 541, 540, 483, 484, 485; 271/237, 248, 149

[56] References Cited

U.S. PATENT DOCUMENTS

| | | | |
|---|---|---|---|
| 3,245,859 | 4/1966 | Busk | 156/484 |
| 3,997,384 | 12/1976 | Kuring et al. | 156/269 |
| 4,080,727 | 3/1978 | Stolle et al. | 156/484 |
| 4,183,779 | 1/1980 | Barker et al. | 156/542 |
| 4,240,848 | 12/1980 | Barker | 156/350 |
| 4,329,191 | 5/1982 | Barber | 156/350 |
| 4,405,122 | 9/1983 | Faltin | 271/149 |
| 4,473,429 | 9/1984 | Crankshaw | 156/485 |
| 4,615,757 | 10/1986 | Treiber | 156/542 |
| 4,844,758 | 7/1989 | Hamamura et al. | 156/361 |
| 4,851,075 | 7/1989 | Parker | 271/237 |
| 4,969,305 | 11/1990 | York et al. | 156/542 |
| 5,162,069 | 11/1992 | Morris | 156/542 |

Primary Examiner—David A. Simmons
Assistant Examiner—James J. Emgel, Jr.
Attorney, Agent, or Firm—Hughes, Multer & Schacht

[57] ABSTRACT

Apparatus for labelling file folders and other artifacts which includes one or more work stations, the number of work stations typically matching the number of labels that are to be applied. Work stations may have: (1) fixedly positioned label rolls, or (2) label rolls which can be shifted back and forth so that labels from different rolls can be applied at a given file folder location, or (3) a mixture of these two types of label roll supports. The apparatus can be computer controlled, which makes custom labelling practical. Also disclosed are methods for labelling artifacts which employ labelling apparatus of the character just described.

31 Claims, 14 Drawing Sheets

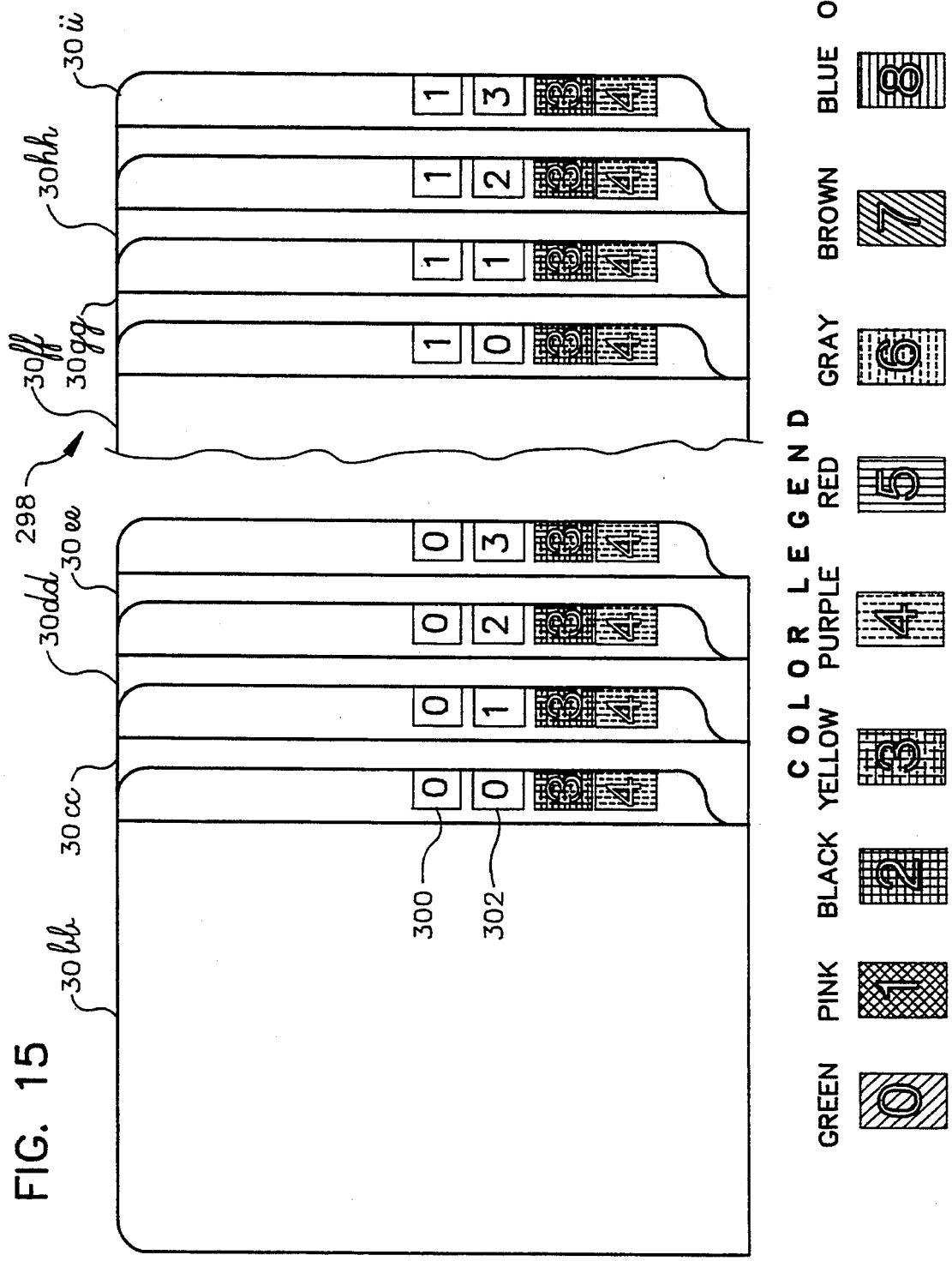

APPLICATION OF IDENTIFYING INDICIA

TECHNICAL FIELD OF THE INVENTION

The present invention relates to novel, improved methods and apparatus for applying identifying indicia to a variety of products including envelopes, file folders, jackets, etc.

Numerical characters are commonly employed to identify and differentiate among files, and the principles of the invention will be developed primarily with reference to this application in the interest of brevity and clarity. However, it is to be understood that this is not intended to limit the scope of the invention as defined in the appended claims.

For the reasons discussed in the preceding paragraph, the principles of the present invention will be developed with reference to a single application of the present invention—the applying of identifying labels to file folders. Again, this is not intended to limit the scope of the appended claims.

BACKGROUND OF THE INVENTION

File folders are utilized in staggering quantities to store letters, reports and other records, invoices, photographs, x-rays, clippings, and a host of other items in a chronological, alphabetical, numerical, or other arrangement which provides facile access to the documents as they are needed.

To meet this objective, it is necessary in most circumstances to uniquely identify each of the several folders involved. As indicated above, this is commonly done by applying different, typically multi-digit, numbers to the folders. Furthermore, to facilitate filing and retrieval of the folders, it is common to use contrasting digits on backgrounds color coded to represent the different digits 0 through 9—for example, the number 0 on a green background, the number 1 on a pink background, etc.

At the present time, most manufacturers do this by assigning a different color to each digit, 0 through 9, and then printing sheets with the proper number and its assigned color in the proper location on the sheet. Most manufacturers print only one colored number at a time. Therefore, the sheets must be printed the number of times there are numbers on the label. Next, the sheets are passed through a machine that applies a protective matte finish polyester film to the sheets.

The sheets are then collated into the proper number sequence using a standard collator such as a Speed Klect.

The sheets are then cut into labels, each bearing a complete label number; and the labels are then loaded into a Weber or other label application machine. This machine sprays adhesive onto the backs of the labels and applies the labels in the order in which they are loaded (which may not be correct) to file folders fed through the machine.

This method of manufacturing labels is time-consuming in that the sheets of labels must be passed through the printing press a number of times, depending on the number of numbers on the final label. It is also time-consuming to have to collate the numbers in correct sequential order, then cut them into individual labels, and handle the labels in the application machine.

Proper application of the adhesive is not always achieved. In that case, the affected labels have to be manually coated with adhesive and applied. This is labor intensive and adds significantly to the cost of labelling file folders.

Application of coded sets of labels to file folders in the manner just described also lacks flexibility. For example, one order might be for two folders with one set of labels, six folders with a different set of labels, etc. or for folders labelled with consecutive even numbers. Such production runs are difficult to handle with conventional labelling machines which are designed to apply label sets with sequential numbering—e.g., 001, 002, 003, . . . 999.

Another heretofore proposed machine for labelling file folders is disclosed in Kuring et al. U.S. Pat. Nos. 3,801,408 and 3,997,384, both entitled SYSTEM FOR MAKING COLOR-CODED INDEX TABS and respectively issued on 10 February 1972 and 14 December 1976.

In the Kuring et al. machine, labels are applied to an adhesively backed tape. The segment of the tape bearing the labels is then severed, producing what the patentees term an index tab. Next, a peel strip is removed from the index tab; and the tab is applied to a file folder.

One disadvantage of this machine is the considerable number of steps required to label a folder by virtue by the labels first being applied to a tape which must then be severed, separated from its peel strip, and applied to the file folder. Also, the multiple, label-to-tape and tape-to-folder adhesive bonds afford considerable opportunity for insecure attachment; and opportunities for misalignment abound. The labels must be accurately registered on the type and the severed, tab-forming segment of the tape accurately aligned with the folder being labelled.

SUMMARY OF THE INVENTION

Disclosed herein are novel, improved methods of and apparatus for applying selected labels to a file folder or a series of file folders, these methods and systems being free of the drawbacks of those machines heretofore available for the same purpose.

In one instance, the novel label applying machines of the present invention have a series of generally identical work stations: and the folder being labelled is in turn advanced from one to the next of those stations. At each station, an adhesively backed label is peeled from a backing and applied to the folder.

Rolls of all available characters or indicia may be mounted at each station on a carriage which can be shifted across the path of the folder. This allows one to register a particular label to be applied at that station with the location on the folder where the label is wanted.

The shifting of the roll-supporting carriages at the several label applying stations is controlled by an operator-programmable microprocessor. The microprocessor shifts the carriage at each work station to align the appropriate label roll with the spot on a file folder where a label is to be applied at that station. For example, in a system for numerically labelling folders with the numbers 001 through 999, the microprocessor shifts the label supporting carriage of the first work station, as needed to align with the spot where the initial digit is wanted, that roll of labels with the appropriate numerical character 0 through 9.

This novel operator-programmable control system allows any wanted label or set of labels to be applied to each folder processed through the label applying machine, making it possible to economically label folders on a job shop basis. For example, an order of 100 folders labelled 0–99 plus 10 extra folders labelled 19 and three extra folders labelled 28 could easily be produced in a single run on a relatively uncomplicated, three station machine.

Also, the microprocessor can be programmed to move a file folder through a station without a label being applied to the folder at that station. This provides still more versatility in the application of labels to file folders in accord with the principles of the present invention.

One particularly important advantage of this unique versatility is that it allows one to easily and quickly program the system to produce replacement folders labelled as needed to replace folders spoiled in a previous labelling run. Heretofore, this has been done by hand labelling, a time-consuming and labor intensive, therefore expensive, process.

In machines employing the principles of the present invention, appropriate mechanisms are employed at each work station to advance labels and to peel labels from their backings. These mechanisms can also be controlled by the system microprocessor, thereby facilitating the coordination of the operations at the several work stations.

It is not required in all instances that multiple work stations or shiftable label supplies be employed in applying the principles of the present invention. For example, there are many circumstances in which numbers of file folders with the same labels are required. If the prescribed data or indicia can be accommodated on a single label, a machine embodying the principles of the present invention and having a single work station with a stationary roll or other supply of labels will suffice. Otherwise, a system with multiple work stations, again with stationary label supplies, can be used. Such a system can be used, as one example, make multiple sets of alphabetically labelled file folders.

Systems with single work stations and those in which the labels have stationary supports are less capital intensive and easier and less expensive to maintain than those with the shiftable carriage labelling stations utilized when more flexibility the application of labels is required.

Also, there are applications of the invention in which a mixture of shifting carriage and stationary support work stations can be employed to advantage. One example is the manufacture of numerically labelled sets of folders where high numbers are reached—say, 99,999. In this case, the station which applies the first digit label will apply the same label 10,000 times before the first digit changes. Substantial savings can be realized by employing a work station with a single, stationary roll of labels to apply the initial number label and changing the roll when the next number is reached—i.e., replacing a roll of "ones" with a roll of "twos" every 10,000 folders, for example.

Labels that are to be applied in accord with the present invention may bear an essentially endless variety of indicia—alphabetical, numeric, alphanumeric, and other characters, combinations of characters such as those used in terminal digit filing systems, straight numeric filing systems, etc. The labels will typically be color coded, but this is certainly not a requisite.

Aside from those discussed above, labelling machines and systems employing the principles of the present invention have the advantage that labelling is accomplished without first applying the labels to a tape and then adhering a subsequently formed segment of the tape bearing the labels to a folder. This appreciably reduces the cost of applying labels to folders, reduces the risk of the labels coming loose from the folder, and promotes the correct registration of the labels on the folders.

Another and of course significant advantage of the present invention is the high production rates that can be achieved.

Still another, and obviously important, advantage of the present invention is that stations, machines, and systems employing the principles of the present invention can be used to apply labels: to a variety of folders including those of the flush and tab types; to a variety of other artifacts such as envelopes (e.g., X-ray) and jackets; and in a variety of locations—side edge, bottom or top edge, tab, etc.

From the foregoing, it will be apparent to the reader that one important and primary object of the present invention resides in the provision of novel and improved methods and apparatus for applying labels to file folders.

Other important objects and features and additional advantages of the invention will be apparent to the reader from the foregoing and the appended claims and as the ensuing detailed description and discussion proceeds in conjunction with the accompanying drawings.

BRIEF DESCRIPTION OF THE DRAWINGS

In the drawings:

FIG. 15 is a pictorial presentation of a set of file folders labelled for terminal digit filing in accord with the principles of the present invention.

DETAILED DESCRIPTION OF THE INVENTION

File folders of the type which the labelling machines disclosed herein are designed to label are typically made by folding an appropriately configured piece of heavy paper, plastic, or other sheet stock along a line parallel to the edges of the stock to produce a file folder with a front cover and a back cover. The back cover has an elongated top or side (end) tab or leading edge portion which protrudes beyond the edge of the front cover. It is this leading edge portion or tab to which file differentiating labels are applied.

Figure 1:
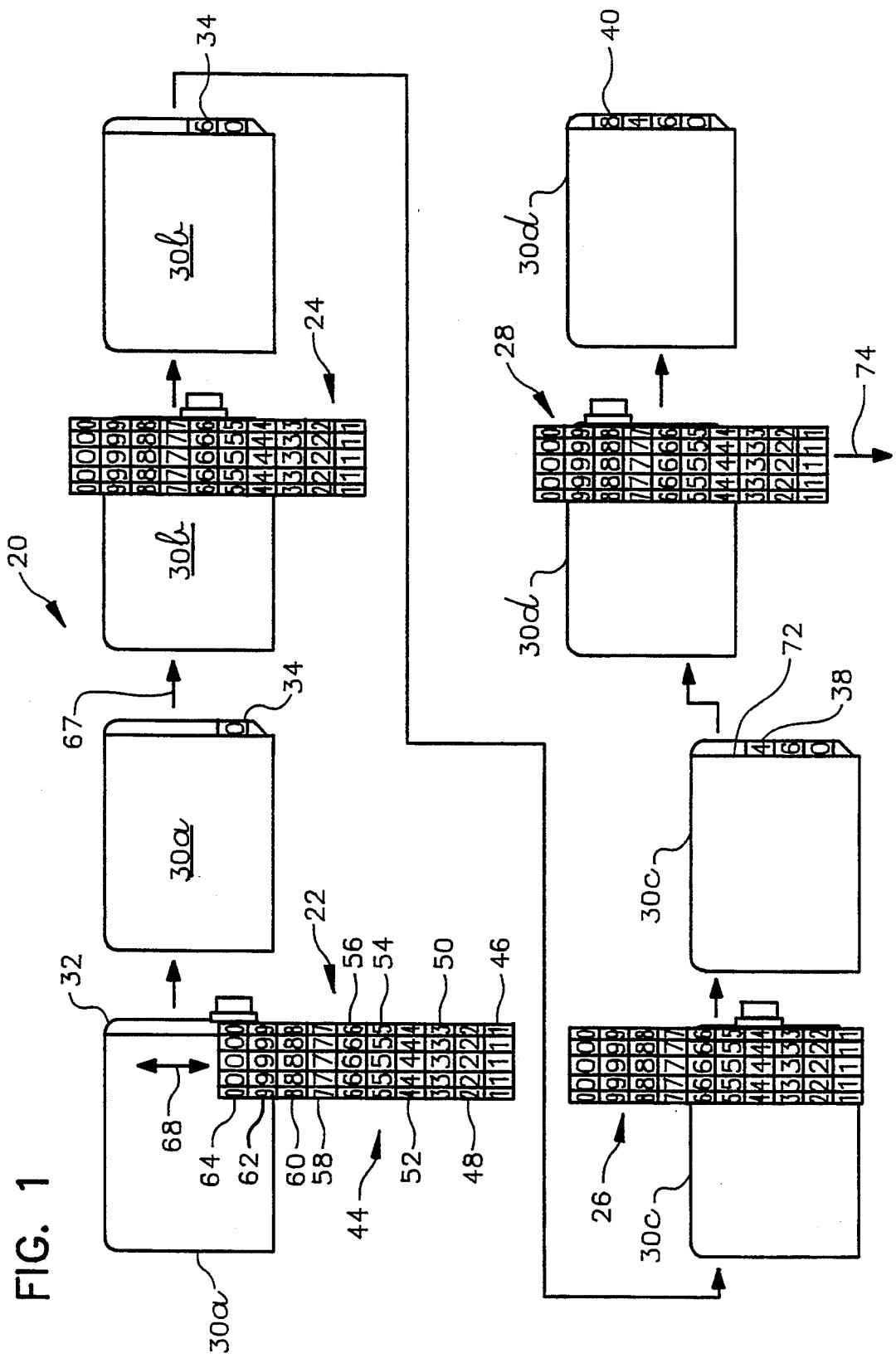
FIG. 1 is a schematic illustration of a system for applying identifying indicia to file folders, that system being constructed in accord with the principles of the present invention and having work stations with carriages which can be shifted to align a selected one of multiple rolls of labels supported from the carriage with the spot on a file folder where a label from the selected roll is wanted.

Referring now to the drawing, FIG. 1 depicts a file folder labelling machine 20 constructed in accord with, and embodying, the principles of the present invention. Labelling machine 20 includes a set of sequentially arrayed work or labelling stations 22 . . . 28. A file folder 30 to be labelled is transferred to, and through, succeeding ones of these work stations. At each work station, one in a set of identifying labels for that particular file folder is applied to the leading edge portion 32 of the folder back cover. In FIG. 1, these labels bear the digits 0, 6, 4, and 8; and they are identified by reference characters 34 . . . 40.

All of the work stations 22 . . . 28 operate in unison. Thus, while a label is being attached to one file folder 30a at station 22, a second label is being attached at labelling station 24 to a second file folder 30b previously labelled at station 22, etc.

Figure 2:
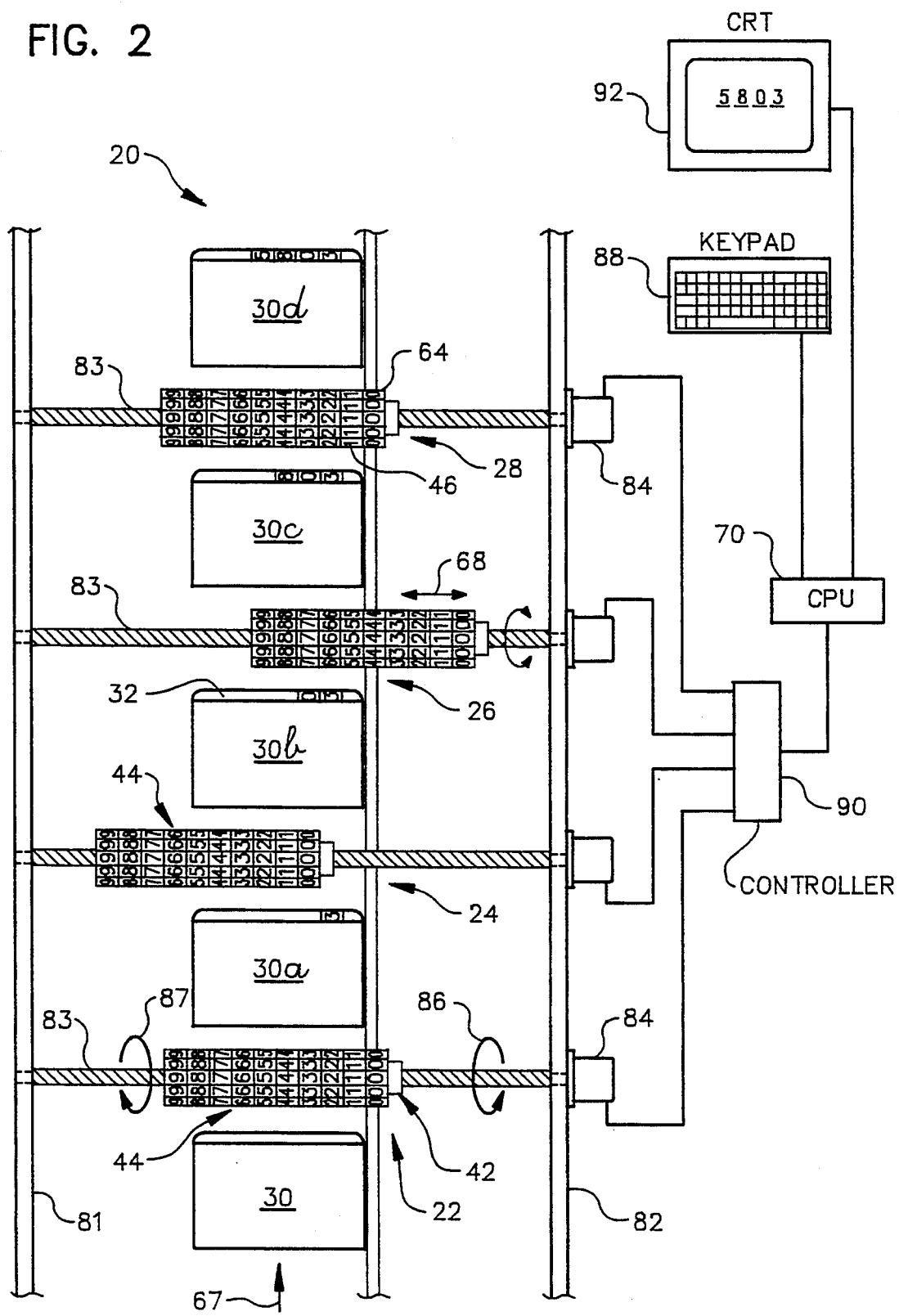
FIG. 2 is a partially schematic view showing the label roll carriage-shifting arrangement employed at each of successive work stations in the system of FIG. 1 to align along a file folder being processed the label which is to be applied to the folder at that work station.

Each of the work stations 22 . . . 28 includes a carriage 42 for a set 44 containing 10 rolls of labels 46 . . . 64 (see FIG. 2). Different rolls in set 44 have labels bearing the file folder identifying digits 9 through 0. All of the labels in each roll are identical.

Each carriage 42 includes a shaft 65 on which a set of hubs 66 (one shown in FIG. 4) carrying label rolls 46 . . . 64 are mounted in end-to-end relationship.

A file folder 30 being labelled travels through machine 20 along the path indicated by arrow 67 in FIG. 1. The carriage 42 and label rolls 44 . . . 64 at each work station 22 . . . 28 can be shifted back and forth in a direction transverse to this path as indicated by double-headed arrow 68. This allows a roll of labels bearing a particular digit or sequence of digits to be aligned with a particular spot on the leading edge portion 32 of the file folder 30 being labelled. This alignment of a selected label with a particular spot on the folder 30 is controlled by a operator-programmable microprocessor 70. This allows folders 30 to be labelled with any wanted combination of the labels carried by the shiftable carriages 42 at the several work stations.

For example, the identifying indicia 0648 have been applied to the completely labelled file folder 30d illustrated in FIG. 1. The carriage 42 and set 44 of labels at work station 28 might then be shifted to the right by microprocessor 70 to align the roll 64 of labels bearing the digit 9 with the spot or location 72 on the leading edge portion 32 of the next folder 30c to arrive at that work station as indicated by arrow 74. This would result in the completely labelled folder 30c exiting from work station 28 bearing the identifying indicia 0649.

It is, in this respect, by no means required that this next one in a four digit sequence of numbers be applied to label 30c. Instead, microprocessor 70 could, as a further example, be so programmed that a second 8 or a 5 would be applied to label 30c at work station 28. Thus, two succeeding file folders bearing the same identifying indicia would be produced or an out-of-sequence file folder would.

Referring now to FIG. 2, machine 20 is there shown in the process of attaching label sets different from those depicted in FIG. 1 to file folders 30a-30d using label rolls also differently arranged on their carriages 42. The carriages 42 for the sets 44 of label rolls 46 . . . 64 at the several work stations 22 . . . 28 are essentially identical. Each has a structural framework 75 that includes vertical side members 76 (one shown in FIG. 4). Each carriage 42 is supported for transverse movement in the arrow 68 direction on guides 77 and 78 which extend through bearings 79 and 80 at the forward and aft ends of the carriage. Guides 77 and 78 extend between and are fixed to side members or rails 81 and 82 of the labelling machine framework.

The carriage 42 at each station is shifted in the transverse, arrow 68 direction by a ball bearing screw 83. These screws extend at right angles to the path 67 travelled by the folders 30a-30d being labelled. The ball bearing screws 83 extend between and are rotatably supported from side members or rails 81 and 82 of the labelling machine framework and are rotated by motors 84. The ball bearing screws 83 are connected to the carriages with which they are associated by carriage-mounted nuts 85 and by sets of recirculating ball bearings (not shown) seated in the external grooves in the screws and complementary internal grooves in the nuts. With the nuts 85 held against rotation by their attachment to carriage framework 75 but free to move back and forth on the associated screws as indicated by arrow 68 in FIG. 1, a carriage 42 and set 44 of label rolls mounted thereon can respectively be shifted to the right by employing its motor 84 to rotate the associated ball bearing screw 83 in the counterclockwise direction indicated by arrow 86 in FIG. 2 and to the left by rotating the screw in the opposite, clockwise direction indicated by arrow 87.

Referring still to FIG. 2, instructions are inputted to microprocessor 70 by way of a conventional keypad or keyboard 88. The programmed microprocessor 70 is connected to a conventional controller 90. The microprocessor outputs to controller 90 signals which so enable the controller that the motors 84 at the work stations 22 . . . 28 controlled by it are activated to rotate the thereby driven ball bearing screws 83 at the appropriate times, in the appropriate direction, and for the appropriate number of revolutions or fraction of a revolution.

A conventional monitor 92 allows an operator to visually review the instructions inputted to microprocessor 70. Monitor 92 can also be employed to display such other valuable information as the total number of file folders labelled in a given run, the number of file folders labelled with a particular set of labels, etc. Monitor 92 can also display to the operator machine errors detected by a variety of sensors (generally not shown) which provide feedback to microprocessor 70.

The folders 30 to be labelled are transferred to and through the first work station 22 and each succeeding work station 24 . . . 28 and away from the last work station 28 by endless conveyors. A representative of one of these conveyors is illustrated in FIG. 3 and identified by reference character 94.

Conveyor 94 includes a set of endless belts, 98, 100, and 102, extending between, and trained around, drive and idler rolls 104 and 106 in parallel, spaced apart relationship. Drive roll 104 is rotated by a conventional, schematically depicted motor 107. With motor 107 running, endless belts 98 . . . 102 displace a file folder 30 supported by them in the direction indicated in FIG. 3 by arrow 108.

Figure 3:
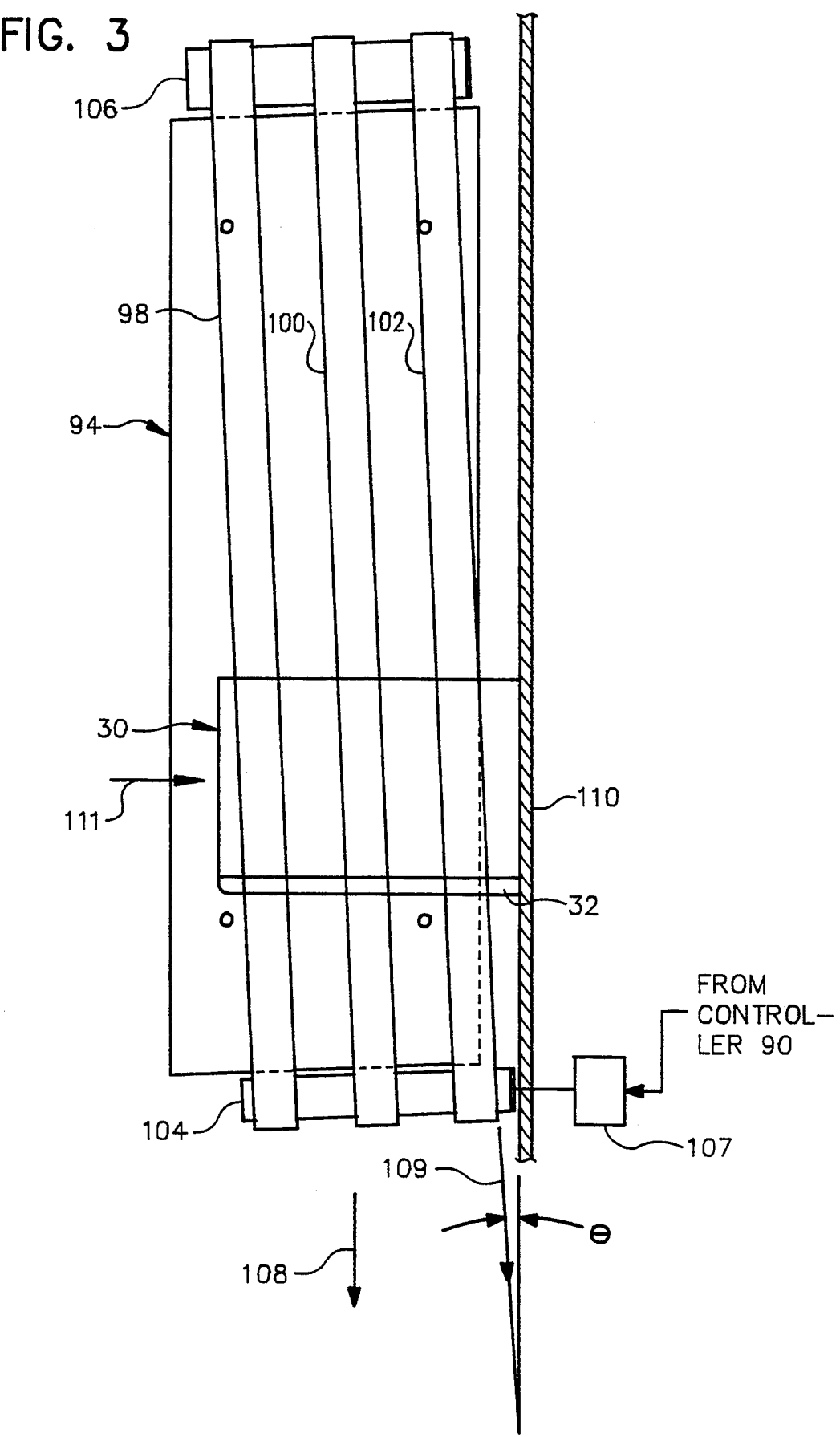
FIG. 3 is a plan view of a representative one of several similar conveyors employed in the apparatus of FIGS. 1 and 2 to transfer file folders to the first of the work stations and between work stations and to take labelled folders away from the last of the work stations.

Referring still to FIG. 3, there is an angle θ-typically on the order of 5°—between the direction of travel of endless belts 98 . . . 102 indicated by arrow 109 and a file folder guide 110 paralleling labelling machine side rail 82. This results in the endless belts exerting on the folders 30 carried by them a force acting in the direction indicated by arrow 111. This force holds the file folders against guide 110, ensuring that they are properly positioned in the transverse direction for accurate label placement when the folder arrives at the labelling station to which it is transferred by a particular conveyor.

The first work station 22 to which a file folder is delivered as by an endless conveyor such as that illustrated in FIG. 3 and identified by reference character 94 is representative. That work station is depicted in detail in FIG. 4 along with one representative roll 64 of labels. This label roll includes a narrow, elongated, disposable backing 112 with a series or string of identical, adhesively backed labels 34 bearing the number 0 spaced along the backing strip. Labels 34 are also typically color coded to facilitate the location of a wanted file in a file drawer or other storage unit.

In addition to the shiftable carriage 42 for label roll 64 and the ball bearing screw 83 for shifting that support from side-to-side to align the labels in roll 64 with a particular spot on the leading portion edge 32 of a file folder 30 being labelled, labelling station 22 includes: idler rolls 113 and 114 substantially equal in length to carriage 42 over which the backing strips 112 with their burdens of labels 34 are trained. Spacers 115 fixed to roll 113 at intervals therealong confine backing strips 112 with their labels 34 to straight paths as the label rolls 46 . . . 64 are unwound to advance selected labels to the location at which the labels are stripped from the backing strips and applied to the file folders being labelled. This is accomplished with a set of cooperating mechanisms which includes: a retractable knife or peel bar 116 of a span approximating that of labels 34 for peeling labels from backing strips 112, a solenoid-operated label advancing mechanism 118, and a take up roll 120 of substantially the same length as the disposable backing strips are wide. Also, labelling station 22 includes: (a) vertically aligned, upper and lower label positioning blocks 122 and 124 separated to provide a gap 126 along the line of file folder travel 67 through work station 22; and (b) cooperating, upper and lower nip rollers 130 and 132 supported from the machine frame for firmly adhering labels in the wanted locations to the file folder leading edge portions 32. Transfer conveyors of the character illustrated in FIG. 3 deliver file folders to work station 22 and from that work station to the next work station 24. For the sake of clarity and because it would add nothing, the just-mentioned conveyors have been omitted from FIG. 4.

Figure 4:
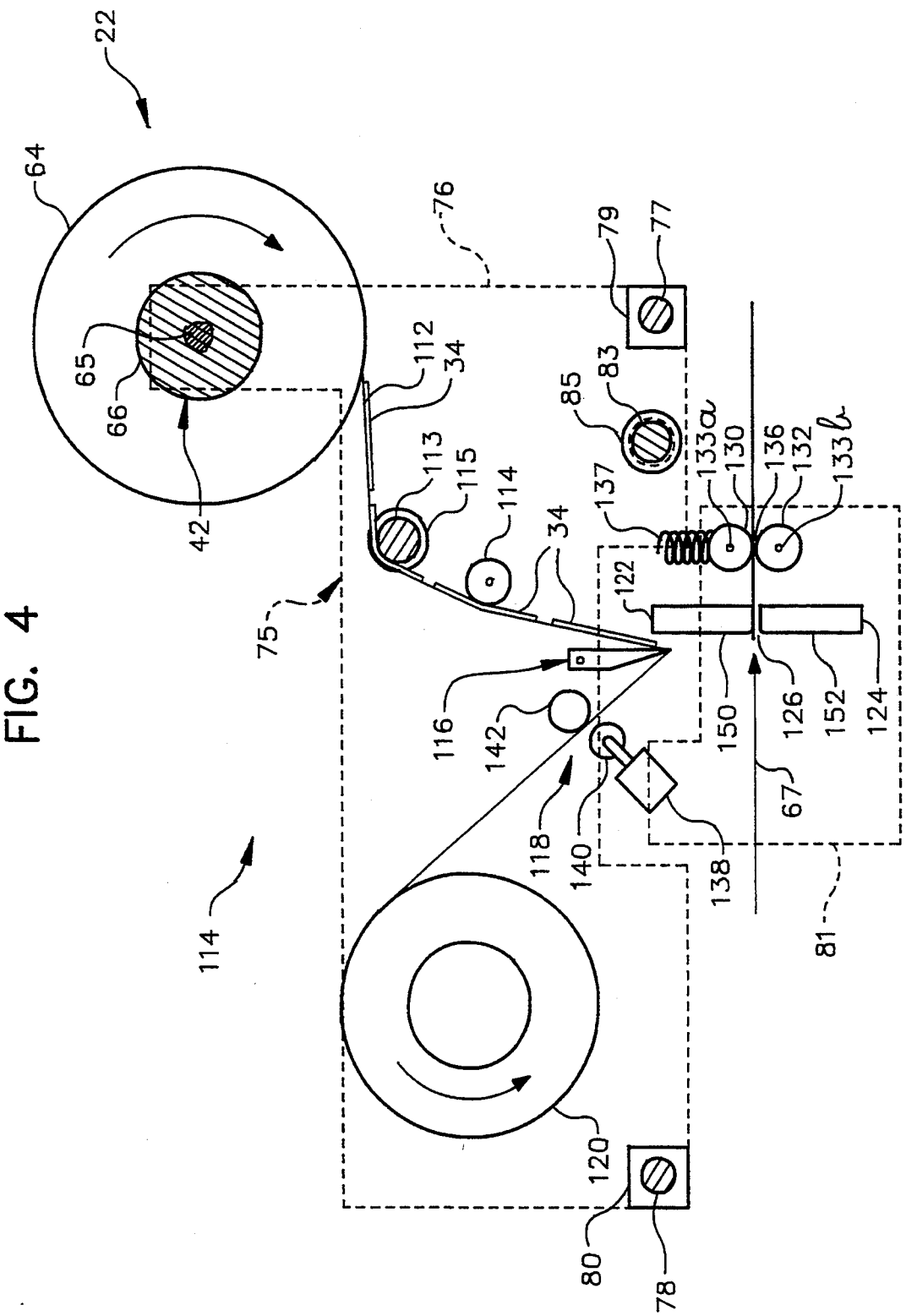
FIG. 4 is a generally schematic view of a representative work station.
Figure 4A:
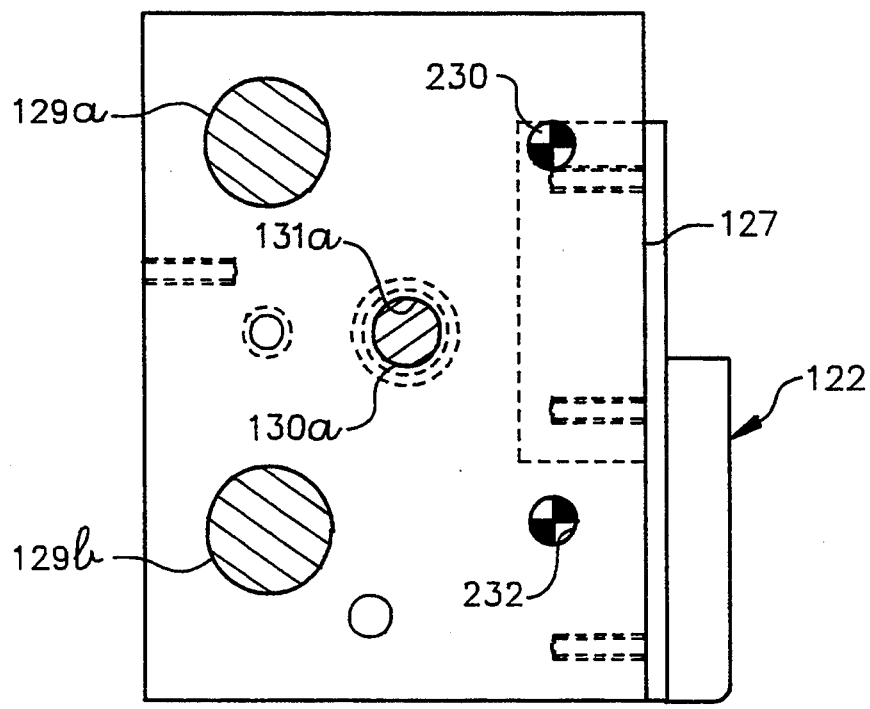
FIGS. 4A and 4B are side views showing how a label positioning system employed in the system of FIG. 1 is assembled, installed in the machine, and aligned to position a label for application to the selected spot on the file folder being labelled.
Figure 4B:
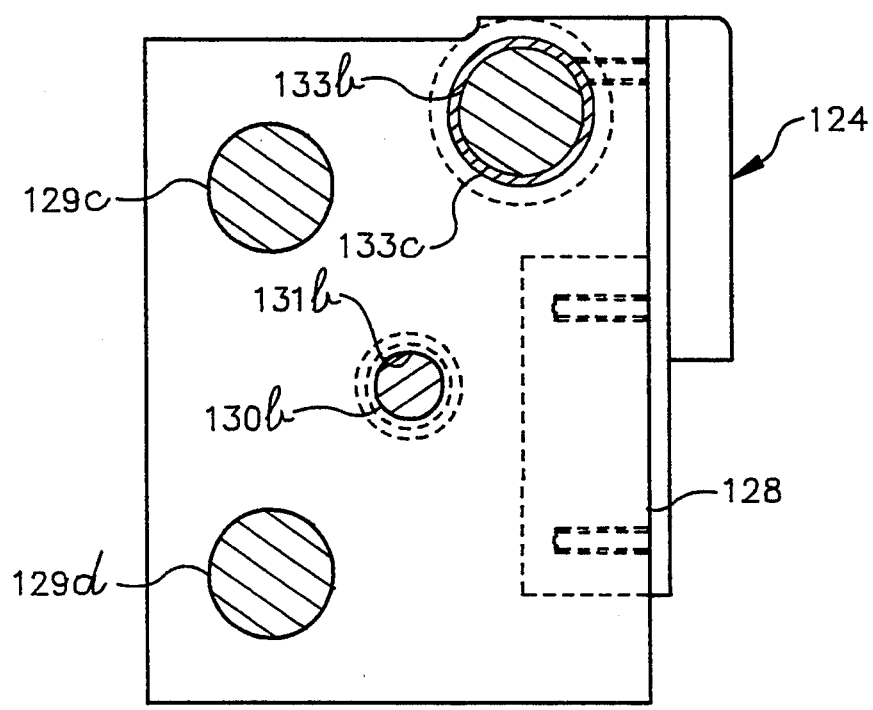

The label positioning blocks 122 and 124 are respectively assembled to a pair of upper side plates 127 and a pair of lower side plates 128 at the forward or upstream edges of the plates (one side plate of each pair is shown in FIG. 4A). The positioning block/side plate assemblies are mounted for sliding transverse movement in the arrow 68 direction on machine frame-supported rods 129a and 129b (the assembly of upper positioning block 122 and side plates 127) and 129c and 129d (the assembly of lower positioning block 124 and side plates 128).

Positioning blocks 122 and 124 are shifted from side-to-side—i.e., in an arrow 68 direction—to align them with that spot on a folder 30 where a label such as one of those identified by reference characters 34 . . . 40 is to be applied at a given station (or by a single station machine). This accomplished by rotating upper and lower, machine frame-supported rods 130a and 130b which are threaded through drilled and tapped apertures 131a and 131b in upper and lower side plates 127 and 128 (one side plate 127 aperture and one side plate 128 aperture are shown in FIG. 4A).

This just-described scheme for providing and aligning a label positioning mechanism can be equally well employed in a machine with a shiftable label supply such as that identified by reference character 20 and in those hereinafter described machines and systems with stationary label supplies.

Application of a label to a file folder 30 at each of the labelling stations 22 . . . 28 is carried out in the same manner except for (typically) the label which is applied and the location on the leading edge portion 32 of the file folder 30 where the label is applied. What happens at labelling station 22 is typical and is shown in FIGS. 5–9. As a folder being labelled (here 30a) approaches labelling station 22, a vertically displaceable stop 134 is raised across the path 67 travelled by the folder to station 22 and then through the gap 126 between the upper and lower label positioning blocks 122 and 124 into the nip 136 between the set of upper and lower nip rollers 130 and 132 in which the upper roller is biased toward the lower roller as by schematically depicted spring 137 to exert pressure on the labels applied to the folders being labelled. The nip rollers are supported from the framework of machine 20 on shafts 133a (see FIGS. 4 and 4A) and 133b with the latter extending through a sleeve-type bearing 133c incorporated in the assembly of lower positioning block 124 and lower side plates 128. The nip rollers 130 and 132 are rotated in the usual opposite directions by a conventional drive which has not been shown as it is not part of the present invention.

This upward displacement of stop 134 is effected by outputting an appropriate control signal from controller 90. Elevated, the stop halts file folder 30a short of label positioning blocks 122 and 124 as shown in FIG. 5.

Next to function is label advancing mechanism 118. This mechanism is so supported that it is aligned with that location on the leading edge portions 32 of file folders 30 reaching work station 22 where labels are to be applied at that work station. The details of the label advancing mechanism support and the supports for the components of that mechanism are not part of the present invention or required for an understanding of that invention. They will accordingly not be pursued in this specification.

Once folder 30a is halted, controller 90 (see FIG. 2) outputs a signal which results in a solenoid 138 of label advancing mechanism 118 being actuated. That results in an idler roll 140 with the same span as each of the several sets of labels 46 . . . 64 being pressed against a cooperating, similarly oriented and dimensioned driven feed roll 142. With driven roller 142 rotating in the direction indicated by arrow 144 in FIG. 6, this displaces the backing 112 of the selected label roll 46 . . . 64 and the labels 34 carried by that strip in the direction indicated by arrows 145 and 146.

Figure 5:
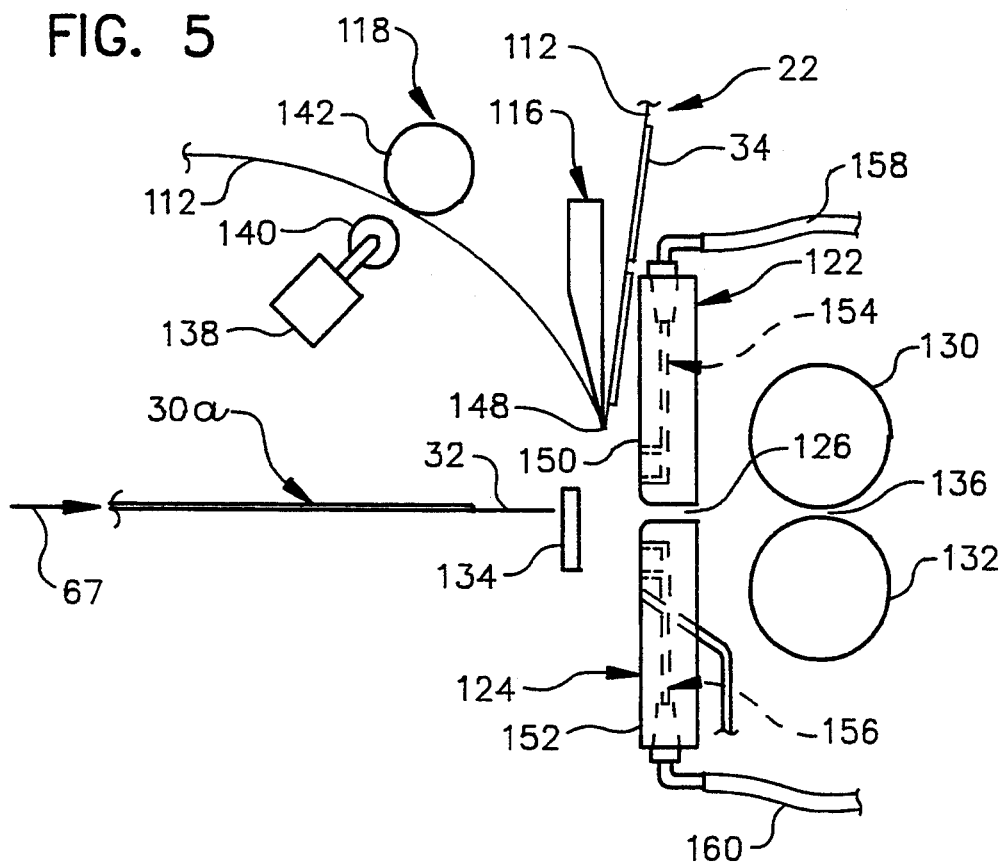
FIG. 5 shows the components of the representative work station in initialized positions.
Figure 6:
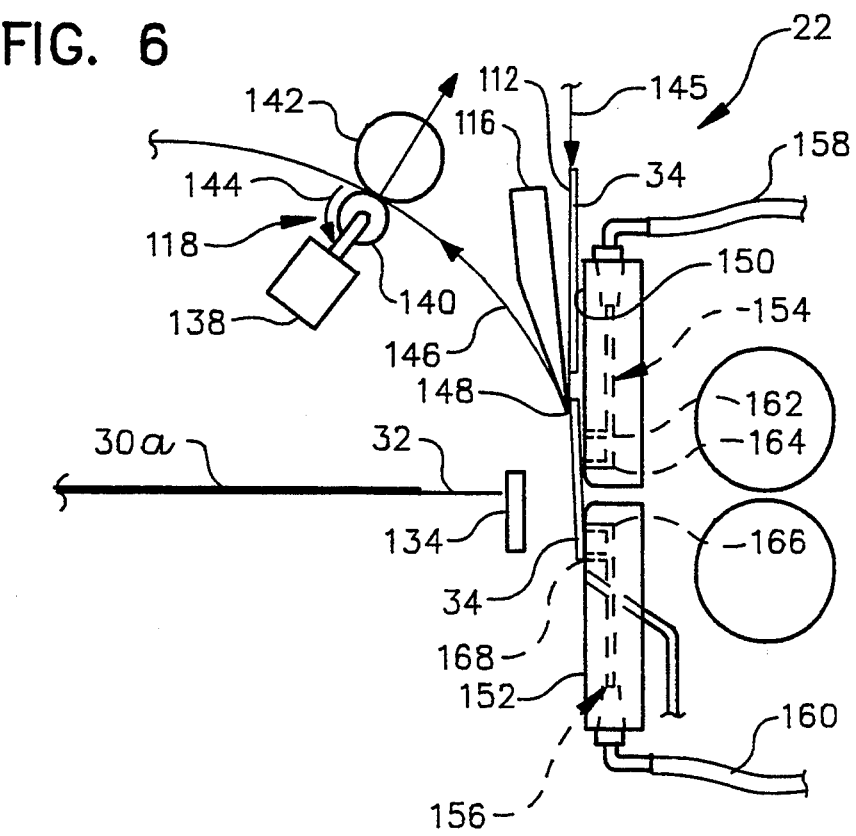
FIG. 6 shows the same components in the process of detaching a label from its backing and positioning the detached label for application to the folder at a selected portion along the leading edge portion of the folder.
Figure 7:
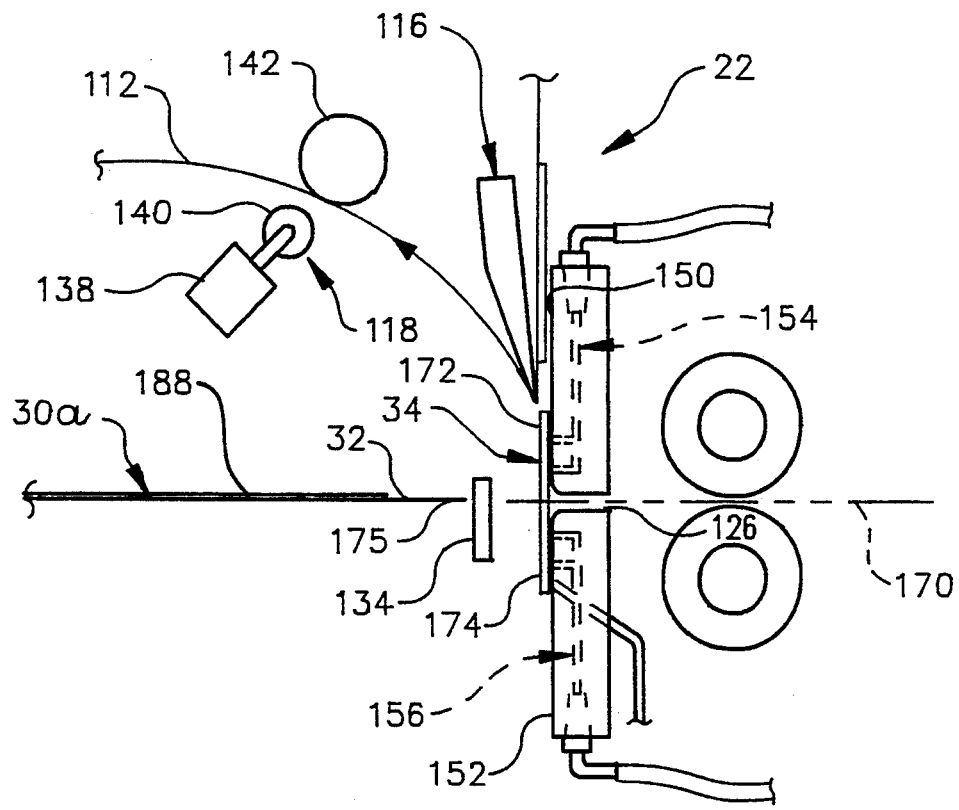
FIG. 7 shows the work station with the label positioned for application to the folder.

As this movement continues, and with the backing strip 112 trained around the sharp lower edge 148 of the transversely extending knife or peel bar 116—which has meantime advanced from the retracted initialized position shown in FIG. 5 to the position shown in FIG. 6—the leading, next available label 34 on the backing strip separates from it as is also shown in FIG. 6. As it separates, the label 34 is temporarily adhered to the upstream faces 150 and 152 of upper and lower positioning blocks 122 and 124 by the illustrated vacuum systems 154 and 156. These systems include external vacuum lines 158 and 160 connected to an external vacuum source (not shown) and internal vacuum passages including (typically) four sets 162 . . . 168 of branch passages which open onto the upstream faces 150 and 152 of the positioning blocks. The branch passages in each set are arrayed in a straight line parallel to file folder path 67 across the positioning block 122 or 124 in which they are formed with the passages in each set combining to span the positioning block, in which they appear.

With the branch vacuum passages 162 . . . 168 located as shown in the drawings and just discussed, the detached label 34 (see FIG. 7) is so temporarily held to the upper and lower label positioning blocks 122 and 124 that the transverse midline 170 of the label coincides with the path 67 followed by the folder 30a being labelled through the center of the gap 126 between the upper and lower label positioning blocks 122 and 124. Thus, the label 34 is centered on the path 67 of the file folder; and the segments 172 and 174 of the label above and below the leading edge 175 of the back cover of folder 30a are of essentially equal width, which is not a requirement as circumstances in which off-centering of the temporarily positioned labels might be advantageous are also envisioned.

Once the leading label 34 is detached and positioned, solenoid 138 is caused to changed states. This results in idler label feed roll 140 being retracted to the initialized position shown in FIGS. 5 and 7-9. That halts label backing strip 112 with the next available label 34 on the strip positioned for detachment and application to a subsequent file folder 30 reaching labelling station 22 after file folder 30a.

Figure 8:
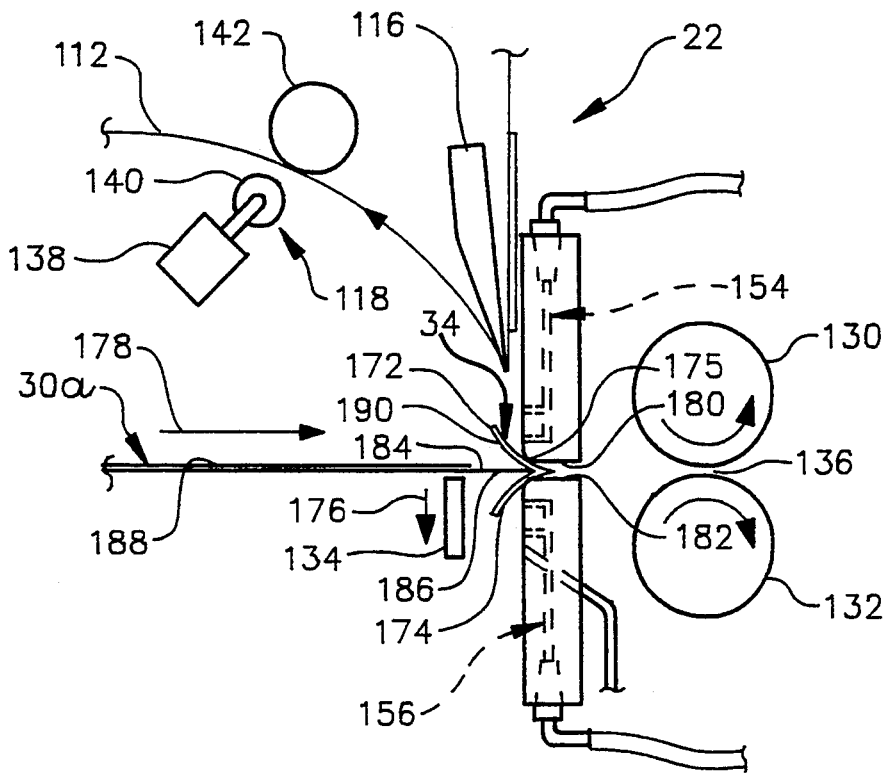
FIG. 8 shows the work station with the label in the process of being picked up by the folder.

Also, once the label 34 to be applied at station 22 has been separated from backing strip 112 and temporarily adhered to upper and lower positioning blocks 122 and 124, controller 90 causes the folder advance halting stop 134 to be displaced downwardly as shown by arrow 176 in FIG. 8 to the initialized position below the path 67 followed by folder 30a through labelling station 22. This allows folder 30a to resume movement in the direction indicated by arrow 178 through the gap 126 between the upper and lower positioning blocks 122 and 124. As file folder 30a reaches the positioning blocks, its back cover leading edge 175 engages the label 34 positioned on the upstream faces 150 and 152 of the label positioning blocks 122 and 124 along the midline 170 of the label. Continued movement of the file folder in the arrow 178 direction therefore pushes the label through gap 126; and the apposed edges 180 and 182 of the upper and lower positioning blocks 122 and 124 bend the integral, upper and lower segments 172 and 174 of the label toward the upper and lower surfaces 184 and 186 of the file folder's leading edge portion 32 which extends beyond the edge of front file folder cover 188.

As the movement of the file folder 30a through gap 126 continues, this displacement of label segments 172 and 174 toward file folder leading edge portion upper and lower surfaces 184 and 186 also continues; and the adhesive (not shown) on the back face 190 of the partially adhered label 34 bonds the segments to the leading edge portion upper and lower surfaces 184 and 186.

Figure 9:
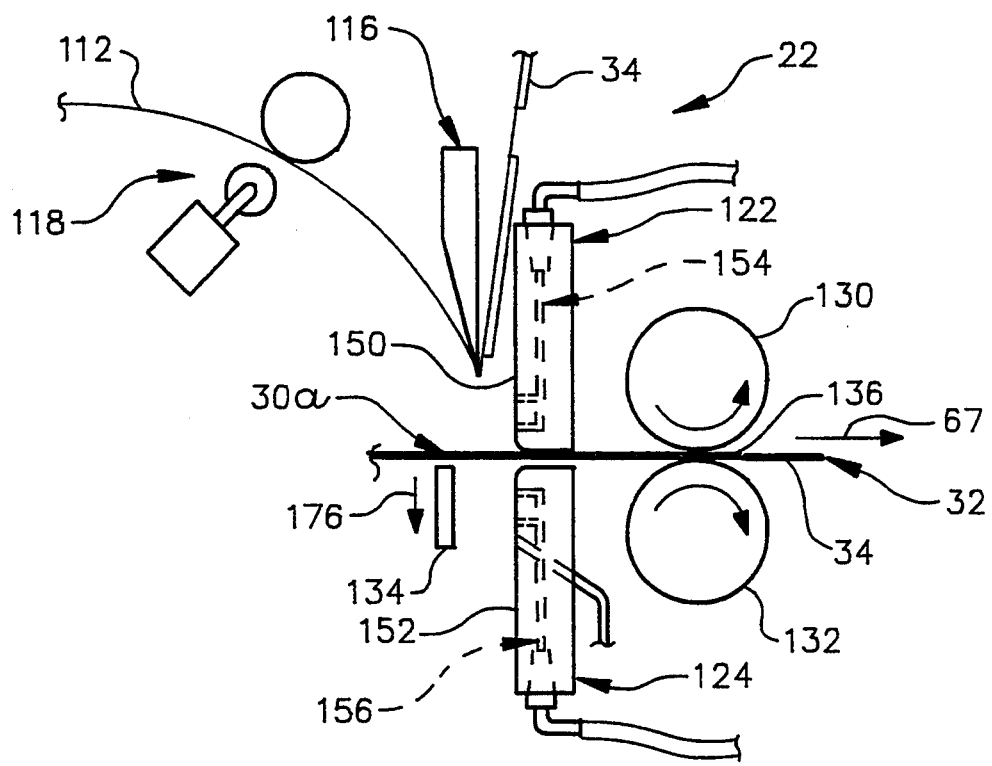
FIG. 9 shows the work station in the process of affixing the label to the folder.

Thereafter, as shown in FIG. 9, the file folder 30a and partially adhered label 34 are passed through the nip 136 between transversely extending, counterrotating nip rolls 130 and 132. These rolls press label segments 172 and 174 firmly against upper and lower folder surfaces 184 and 186. This securely attaches the label to, and in the wanted position along, the file folder leading edge portion 32.

In the illustrated labelling machine 20, the file folder 30a with one—34—label attached is then transferred by nip rolls 130 and 132 to a second conveyor of the character illustrated in FIG. 3 for delivery to the next labelling station 24. There, a second label 36 is attached to file folder leading edge segment 32 immediately adjacent the label 34 attached at station 22. File folder 30a then proceeds in a similar fashion to and through labelling stations 26 and 28. There, labels 38 and 40 are attached. The result is a completely labelled file folder such as the one illustrated in the lower right-hand corner of FIG. 1 and identified by reference character 30d.

Figure 10:
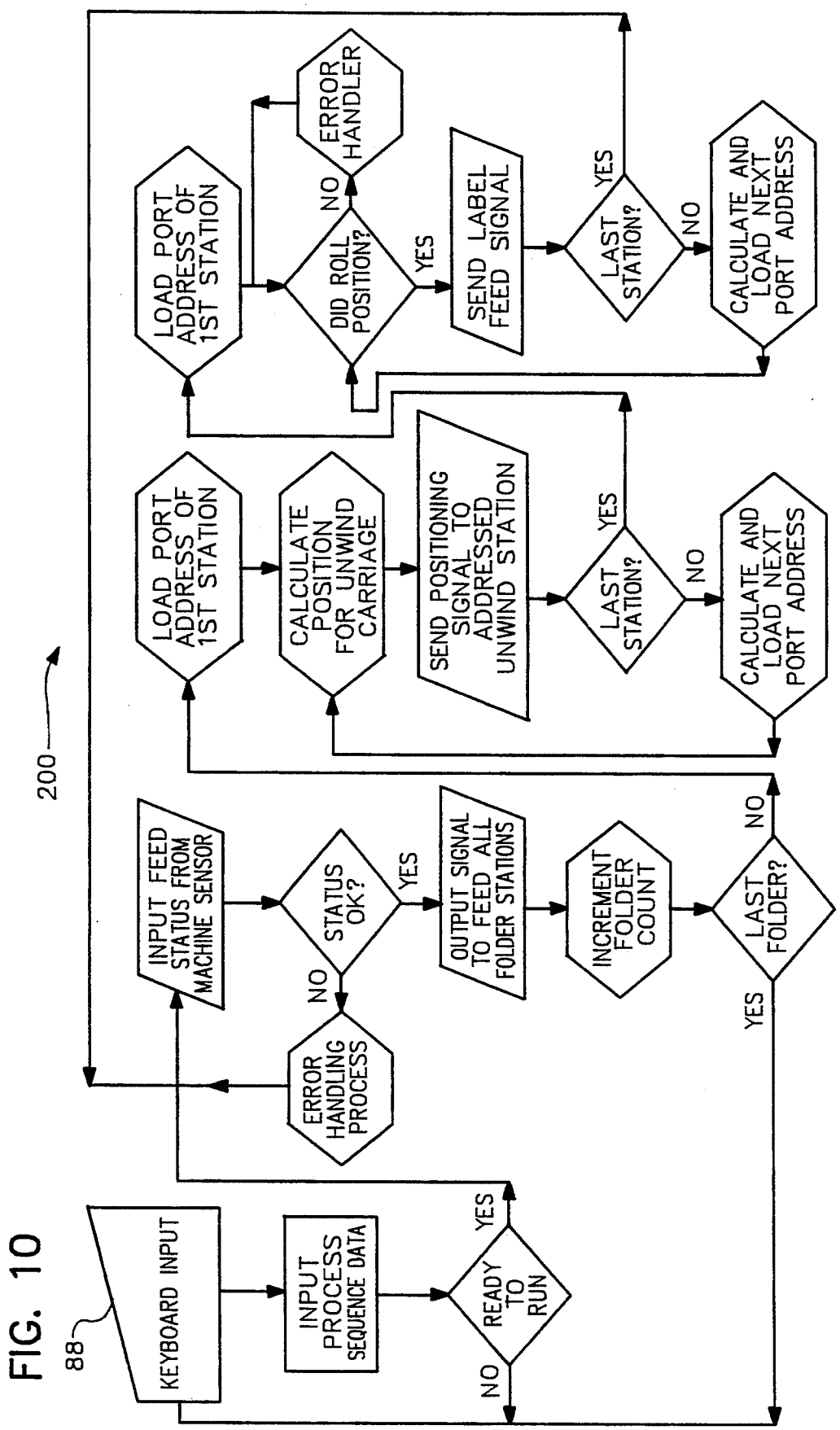
FIG. 10 is a logic flow diagram for a program which controls the operation of the FIGS. 1 and 2 system.

An appropriate operating sequence for microprocessor 70 is illustrated in FIG. 10 and identified by reference character 200. Briefly, the microprocessor first checks to insure that the selected sequence of labels (typically read from a disk file) is a permitted one. If not, an appropriate message is displayed on monitor 92.

On the other hand, if the label or labels selected for a folder or the folders in a run are allowed, labelling machine 20 is checked to see whether it is ready to run. If not, an error handling process is invoked to correct any deficiencies.

If the labelling machine status is such that it is ready to run, microprocessor 70 outputs signals which result in file folders 30 being concomitantly fed to all of the several work stations 22 . . . 28 or, at the end of a labelling run, to those work stations involved in applying labels to any remaining folders which are not completely labelled. At the same time, the count of labelled folders is incremented; and the several mechanisms described above are restored to the initialized, FIG. 5 positions.

If it is the last folder in a run which has been labelled, an appropriate message is displayed on monitor 92. Otherwise: (a) the port address of the first labelling station 22 is loaded: (b) the position needed for the label roll-supporting carriage 42 at that work station to position the appropriate label roll 46 . . . 64 for application of a label to the wanted spot on the leading edge portion 32 of file folder 30a is calculated; and (c) microprocessor 70 outputs a positioning signal to work station 22. This results in carriage 42 being shifted (if necessary) to align the wanted label roll 46 . . . 64 with that spot on the leading edge portion 32 of file folder 30a where the appropriate label is to be applied.

Thereafter, microprocessor 70 checks to see whether the selected label roll 46 . . . 64 was properly positioned. If not, the appropriate error handling routine is invoked. On the other hand, if the label roll was properly positioned, microprocessor 70 outputs a label feed signal. This results in: (a) solenoid 138 changing state to advance backing strip 112 of the selected label roll 46 . . . 64 and separate the leading label 34; (b) in stop 134 being retracted and the folder 30a at station 22 being allowed to advance through the gap 126 between vertical label positioning blocks 122 and 124 and then through the nip 136 between rolls 130 and 132 to apply the wanted label to the file folder in the manner discussed above.

Also, unless the labelling station involved is the last one, the port address for each succeeding labelling station 24 . . . 28 is calculated and loaded, and the just-discussed operations are concomitantly carried out at all other active work stations. This causes the next wanted label to be applied to folder 30b and any other folders 30c . . . 30n being labelled at the same time by labelling machine 20.

Once the operations resulting in the last label being applied to the last file folder 30a in a run have been completed, the operation of machine 20 is terminated; and an appropriate message is displayed on monitor 92.

Many variations in the labelling process and apparatus described above can be employed to advantage in particular applications of the present invention. For example, the label attached by labelling machine 20 will typically bear numerical characters and be conventionally color coded. However, this is by no means required. The labels need not be color coded, and other types of identifying indicia such as alphabetic or alphanumeric characters can be employed. Or, the identifying indicia may simply be solid colors or patterns of color coded in a manner which allows one labelled file folder to be distinguished from another.

Figure 11:
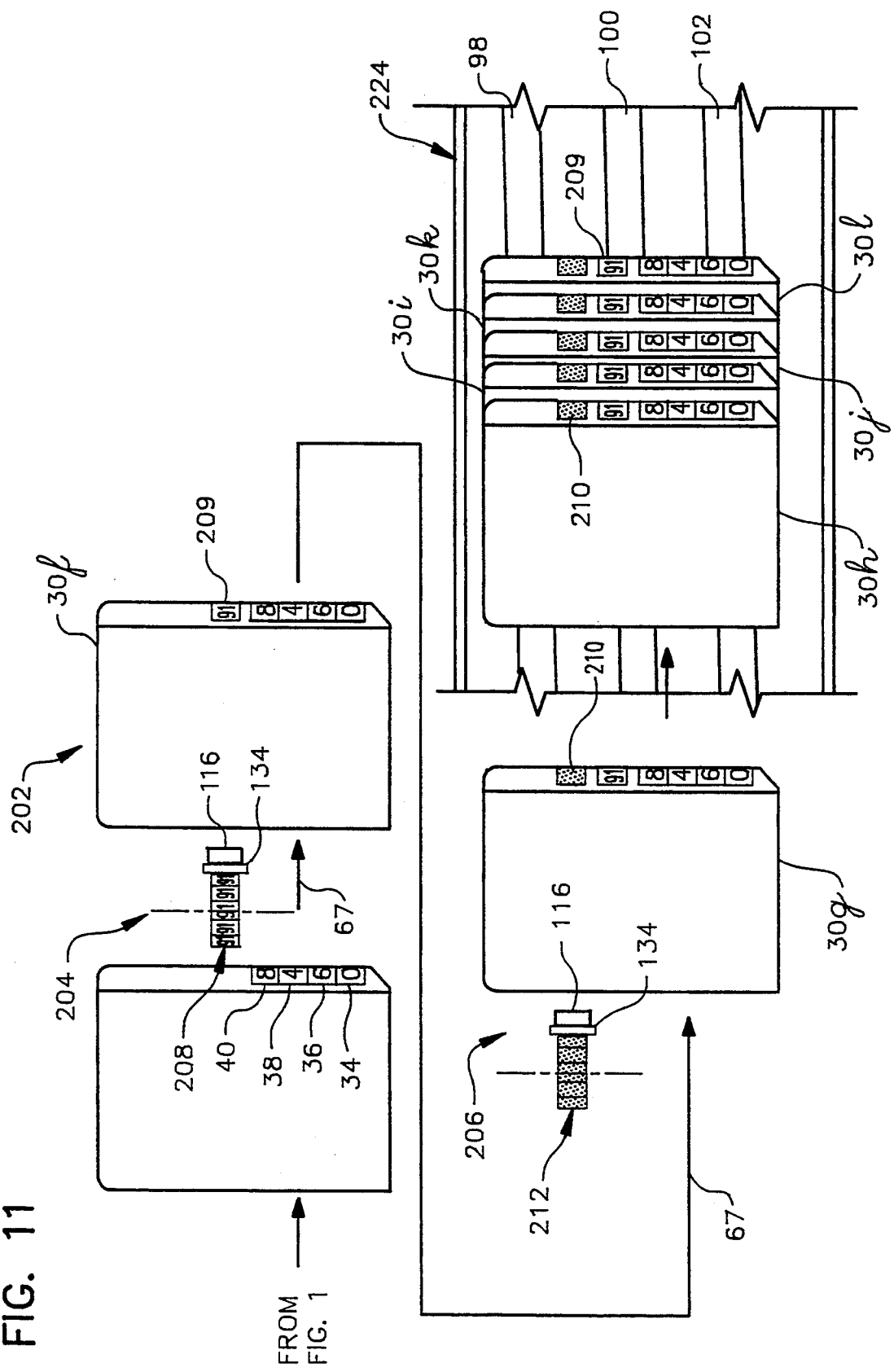
FIG. 11 is a partial schematic illustration of a second system for applying identifying indicia to file folders; this system embodies the principles of the present invention and has work stations with stationary label supplies as well as work stations of the character illustrated in FIG. 1 and a takeaway conveyor for shingling the labelled file folders and thereby making them easy to inspect.

Furthermore, in many circumstances, a labelling machine such as that depicted in FIG. 11 and identified by reference character 202 is preferred. Machine 202 is essentially a duplicate of the labelling machine 20 illustrated in FIG. 1 with two additional labelling stations 204 and 206. Labelling stations 204 and 206 are operated in unison with labelling stations 22 . . . 28 so that labels can concomitantly be attached to different file folders 30 at these several labelling stations.

This machine can advantageously be employed, as one example, when multiple sets of sequentially numbered file folders, each with (typically) five or more numbers are to be produced.

It will be apparent to the reader, from the foregoing description of the present invention, that a label from a different roll 46 . . . 64 at the first labelling station 22 is typically used on every folder 30 being labelled while different labels at the second labelling station 24 are needed only 10 folders, those at the third labelling station 26 only once every 100 folders, and those at the fourth labelling station 28 only once every 1,000 folders. Thus, if a fifth digit were to be added, different labels with a different number would be needed at a fifth labelling station only once every 10,000 folders. At this juncture, or perhaps sooner, it may become advantageous to replace the shifting carriage arrangement illustrated in FIGS. 1–3 and discussed above with a much simpler stationary support and a single label roll with appropriate labels and simply change rolls at the appropriate intervals.

This simplified, less expensive, and easier to maintain arrangement can also be employed to advantage, as a further example, when a large number of folders are to be labelled and the same label—for instance, one in which the identifying indicia is a color only—is to be applied to each of the folders.

In a representative application of exemplary labelling machine 202, shifting carriage labelling stations 22 . . . 28 (see FIG. 1) are employed for the reasons and in the manner discussed above to apply sets of four labels to file folders, thereby producing file folders labelled 0000 through 9999. Labelling station 204 is set up to accomplish the first of the objectives discussed in the preceding paragraph i.e., to apply only labels bearing the numerical character 0 to the file folders being labelled until the illustrated roll 208 of labels 209 bearing the double digit number 91 is replaced with a different roll containing labels bearing a different number. Thus, with labelling machine 202, folders labelled 00000 through 09999, 10,000 through 19,999, etc. as another example can be produced by changing the label roll at work station 204 only once every 10,000 folders. Typically, this means that the machine can run for several hours before the roll has to be changed.

Labelling station 206 is designed to apply only labels 210 of the color represented by stippling in FIG. 11 to the file folders 30 being labelled in machine 202 until the roll 212 of labels 210 at work station 206 is replaced. This is useful, as one example, in producing file folders color coded by category and numerically labelled to differentiate the file folders.

Figure 12:
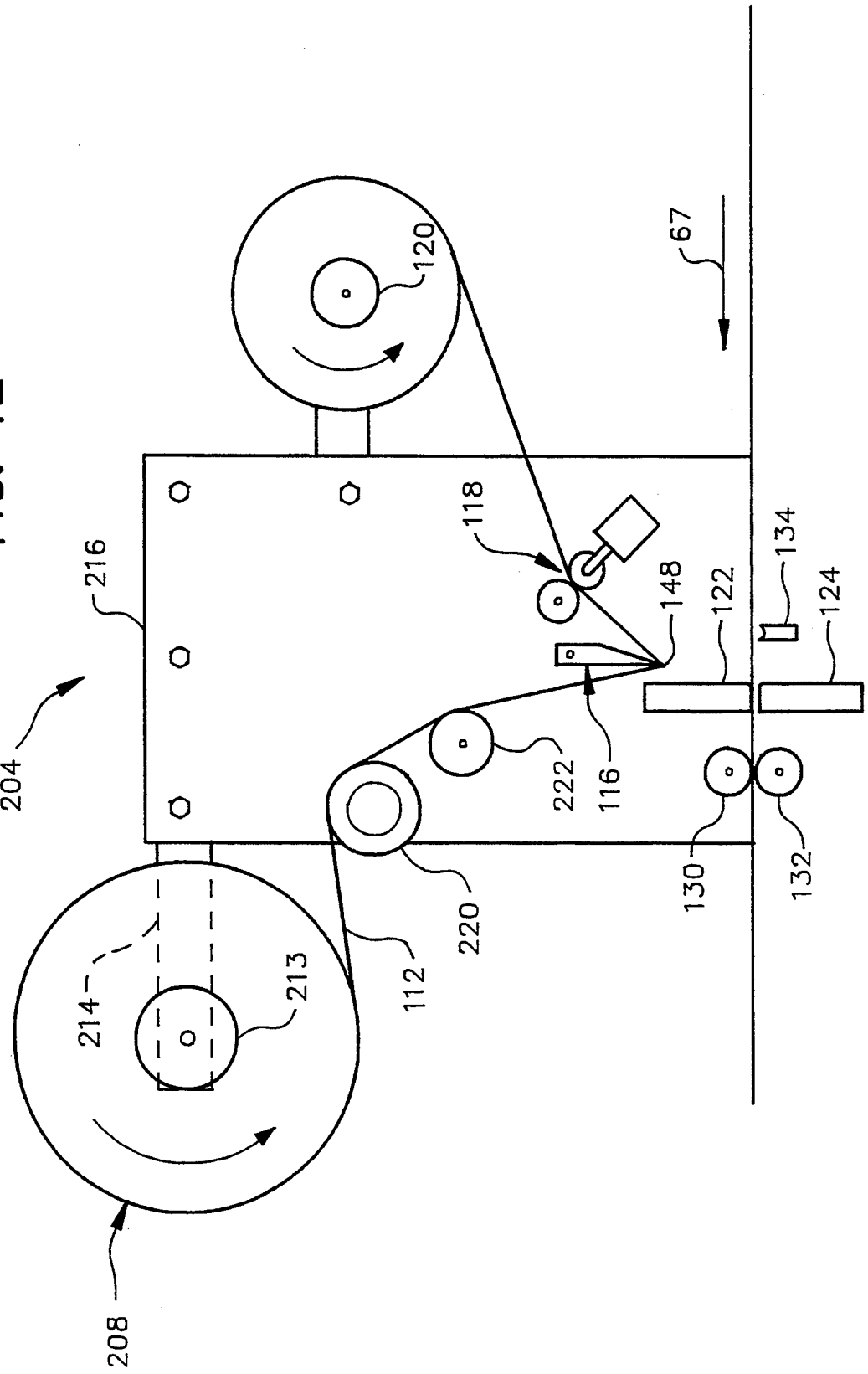
FIG. 12 is a partially schematic view of a work station which embodies the principles of the present invention and has a stationary label support; this work station can be used as a stand alone labelling machine by adding appropriate conveyors, etc., or it may be employed in labelling systems such as that depicted in FIG. 11.

Labelling station 204, which is representative, is shown in detail in FIG. 12. To a considerable extent, this labelling station and a shiftable carriage labelling station as depicted in FIG. 4 and discussed above have similar components. To the extent that this is true, such components are identified by common reference characters.

Turning then to FIG. 12, the label roll 208 at labelling station 204 is supported on a transversely extending, circularly sectioned member 213. This member is attached at one end to a longitudinally extending bracket 214. Roll supported bracket 214 is in turn attached to a vertical side rail 216 of labelling machine 202 at work station 204.

The backing strip 112 of the label roll 64 carried by roll support 213 with its burden of labels 34 is trained: (a) over an idler roll/spacer assembly 220 like that employed in machine 20 and identified by reference characters 113 and 115, (b) over idler roll 222, (c) around the label separating lower edge 148 of transversely extending knife 116, (d) through the label advancing mechanism 118, and (e) onto takeup roll 120.

The manner in which labelling stations 22 ... 28 and 204 operate to attach labels to a folder 30e being labelled at labelling station 204 or to folder 30f being labelled at labelling station 206 is the same except that, as just discussed, the label rolls 208 at station 204 and 212 at station 206 are not shiftable from side-to-side. A completed folder with four single digits applied at labelling stations 22 ... 28, a fifth label with the double digit 91 applied at labelling station 204, and a sixth, color coding label applied at labelling station 206 is identified by reference character 30g in FIG. 12.

An important feature of the labelling machine 202 illustrated in FIG. 11 is that the completely labelled file folders 30g... 30l are shingled on the take-away conveyor 224 which carries the labelled file folders 30 away from the last labelling station 206. This is an important practical feature of labelling machine 202. Shingling makes it easy to visually inspect the labelled file folders. This is desirable to ascertain whether the correct labels have been placed on the labelled file folders, whether the labels are properly aligned, etc.

In other embodiments of the invention with "stationary" label supplies, label positioning blocks which can be shifted from side-to-side as discussed above and shown in FIG. 4A are preferably employed so that the machine can be set up to apply a label from the stationary supply at any designated spot along the file folder being labelled. Also, it is preferred that the stationary label supply (in this case, identified by reference character 208) be similarly set up to advance labels to the spot-aligned positioning blocks. This can be simply and inexpensively accomplished by attaching the supply-supporting vertical side rail 216 to a side plate 127 of the upper side plate/positioning block assembly. Apertures which receive dowels for locating rail 216 on side plate 127 are identified in FIG. 4A by reference characters 230 and 232.

Figure 13:
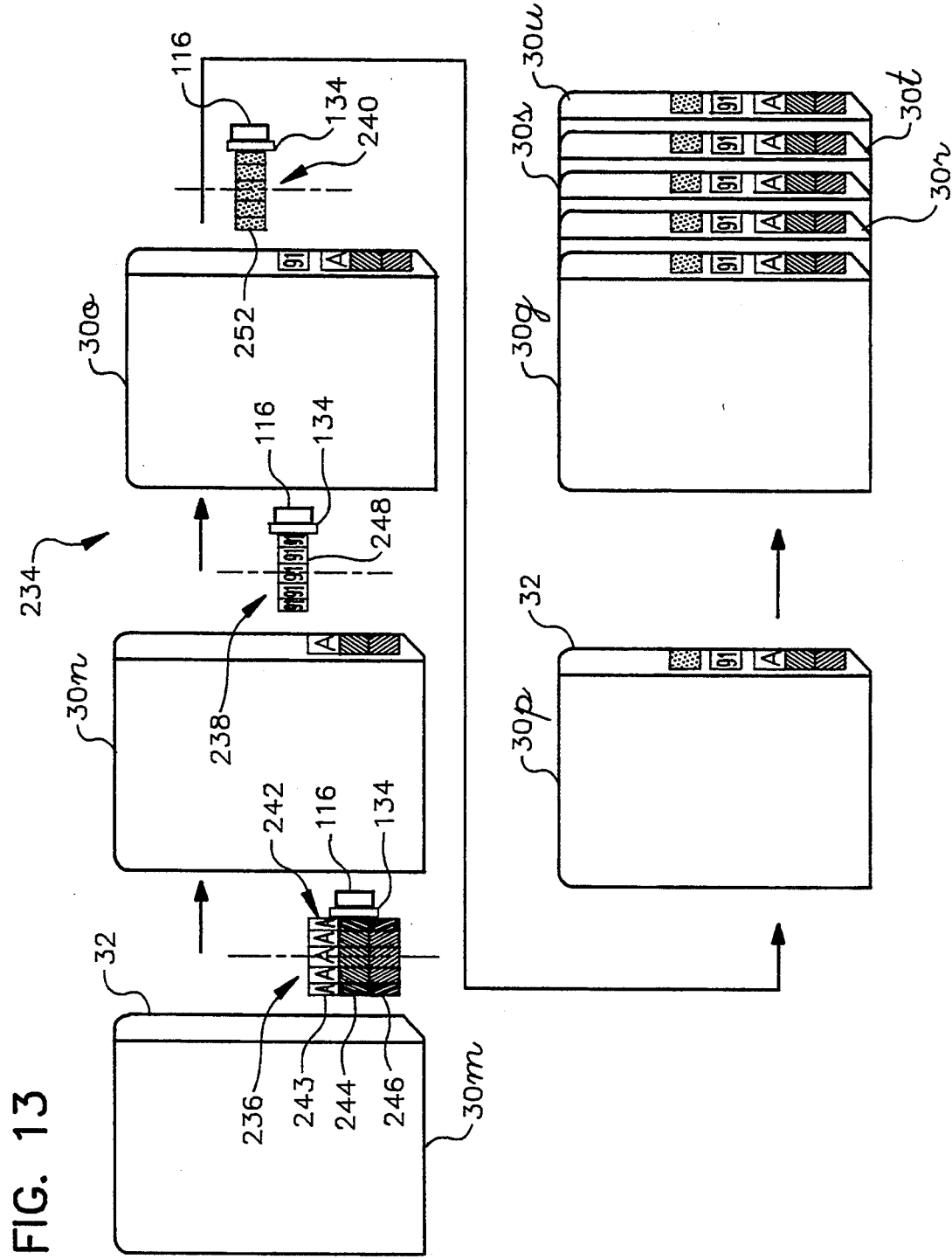
FIG. 13 is a partial schematic illustration of yet another labelling machine or system employing the principles of the present invention; it differs from the machine shown in FIG. 11 primarily in that all of its work stations have stationary label supports.

FIG. 13 depicts yet another labelling machine 234 embodying the principles of the present invention. This machine, in which all of the labelling stations are of the simple, fixed label roll support type shown in FIG. 12, can be used to produce large numbers of identically labelled file folders 30. As a further example, machine 234 can be used to produce multiple sets of file folders 30 with labels at a particular location applied in a sequence that can be duplicated on a roll of labels positioned to apply those labels at the location on each of the succeeding file folders 30 being labelled.

The illustrated exemplary, labelling machine 234 of the character just described has three, simultaneously operating, labelling stations 236, 238, and 240. In the representative application of that machine depicted in FIG. 13, labelling station 236 applies to the file folder being labelled—in this case folder 30m—an alpha label 242 which has two bands 243 and 244 of different colors and a third band 246 bearing an identifying character such as the illustrated A.

The second labelling station 238 at the same time applies to the file folder there being labelled—in this case, a second folder 30n—a year band label 248, in the illustrated case one bearing the current year 91. Finally, the third labelling station 240, also at the same time, applies to a third file folder 30o being labelled a third label or classification band 252 which is a solid color surfaced label.

A completely labelled file folder produced with labelling machine 234 is identified in FIG. 13 by reference character 30p. As in the case of the labelling machine 202 illustrated in FIG. 11, folder 30p is shingled with previously labelled file folders 30q... 30u on the take-away conveyor (not shown in this figure) following labelling station 240 to facilitate visual inspection of the labelled file folders.

Depending upon the project, a labelling machine like that identified with reference character 234 may have only a single station; or, as many stations as may be necessary can be provided to apply labels such as those heretofore discussed and/or bar code, final number, and/or other labels. Reductions and increases in the number of labelling stations as well as those of each character can also be employed in labelling machines which, like that illustrated in FIG. 12 and identified by reference character 202, employ a mix of shiftable carriage and fixed labels support stations and in labelling machines like that identified in FIG. 1 with reference character 20, in which all of the labelling stages have shiftable carriages for supporting the label rolls.

Another application in which labelling machines employing the principles of the present invention can be employed to particular advantage is in the labelling of file folders for "terminal digit" filing systems. Terminal digit is a method of filing in which all files with numbers ending in the last (typically) two, three, or four digits are filed in the same file section or file drawer. In color coded terminal digit systems, a color is assigned to each of the ten digits 0 through 9; and the terminal digits of the number with which a file is labelled are color coded to designate the file section, drawer, etc. Other terminal digit systems simply employ black-on-white terminal digit labels.

Figure 14:
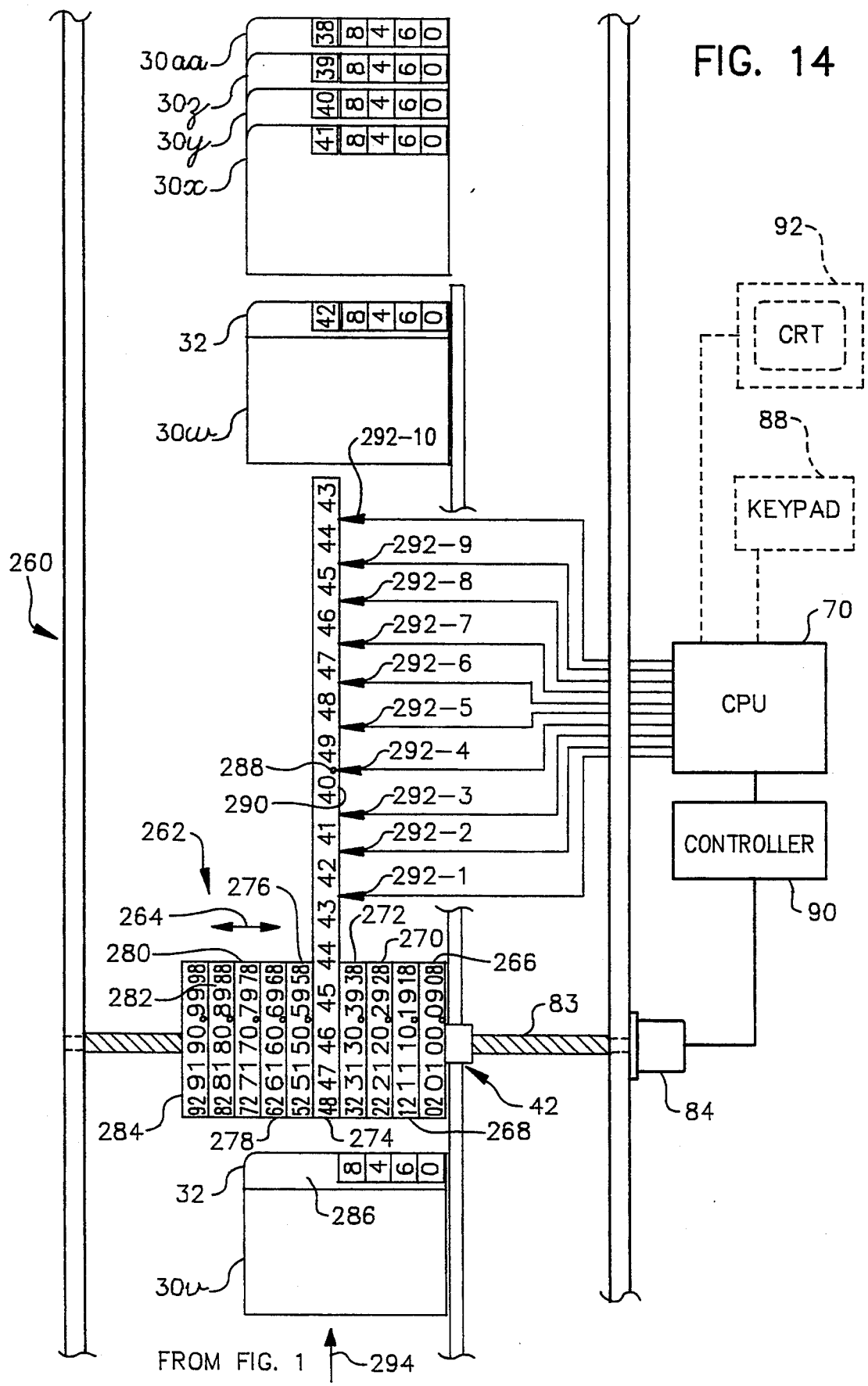
FIG. 14 is a partial schematic view of a fourth labelling machine or system which employs the principles of the present invention; it is particularly designed for applying the particular types and sequences of labels required for terminal digit filing systems and other comparable applications.

Referring again to the drawings, FIG. 14 depicts a labelling machine 260 specifically designed to apply the labels appropriate for a terminal digit filing system. This labelling machine 260 has four stations 22 ... 28 of the character and related as shown in FIGS. 1-3 and discussed above followed by the labelling station 262 illustrated in FIG. 14. These five labelling stations operate at the same time on five different file folders 30v-30z which are sequentially fed first to labelling station 22 and then to each of the other four labelling stations 24, 26, 28, and 262. Labelling station 262 is designed to apply to each of the file folders 30 being labelled at stations 22 ... 28—such as file folders 30v-30aa—color coded label with a set of double digits 00 ... 99 identifying the file number in a terminal digit file section, drawer, etc. numbered 8460. The file number digits applied by machine 260 to the illustrated 8460 folders 30v-30aa are 38 through 43.

A number of the components in the subsystems of labelling machine 260 are similar to those of labelling machine 20, and they have been identified by the same reference characters. Like labelling stations 22 ... 28, labelling station 262 has a label-supporting carriage 42 which can be shifted from side to side as indicated by double headed arrow 264. This shifting aligns a particular one of the ten rolls 266 ... 284 of double digit labels supported by carriage 42 with that spot 286 on the leading edge portion 32 of the file folder 30v being labelled at station 262 where the selected label is to be attached to the file folder. Also, as in work stations 22 ... 28, carriage 42 is shifted as necessary by a ball bearing screw 83 which is rotated by a motor 84. As discussed above, the operation of motor 84 is controlled by a controller 90 and a microprocessor 70 which outputs instructions to the controller.

The label rolls 266 . . . 284 supported by carriage 42 at labelling station 262 have labels with repeating sequences of the two digit numbers in each of the ten successive decades. That is, roll 266 has repeating sequences of labels with the digits 00 through 09, the next roll 268 has repeating sequences of labels bearing the double digit numbers 10 through 19, etc. Thus, labelling machine 260 can be used, as one example, to label 100 sets of file folders in the terminal digit file section, drawer, etc. numbered 8460.

For labelling station 262 to properly transfer the terminal digit labels from rolls 266 . . . 284 to the file folders 30 being labelled, it is necessary for microprocessor 70 to "know" where the different terminal digit numbers on each label roll are with respect to the position at the work station where the labels are detached and applied to file folders 30 previously labelled at stations 22 . . . 28. For example, if folders for file sections 40 through 49 are being labelled, the microprocessor needs to know which of those ten terminal digits on label roll 274 is coming up next when a run of file folders for that section is started or is interrupted and then resumed.

To reach this objective, position locators are provided at appropriate intervals on each of the labels rolls 266 . . . 284. For example, in the exemplary application of the invention illustrated in FIG. 14, holes 288 are punched near the margin 290 of each roll 266 . . . 284 between the last digit in one series of numbers on that roll and a first number of the successive series—as one example, between each label with the number 49 on roll 274 and the next label with the first digit 40 in the succeeding sequence of the ten numbers 40-49. One of the brush or photocell type sensors indicated by reference characters 292-1 through 292-10 in FIG. 14 and spaced along the path 294 of the file folders being processed through station 262 detects the label locating marker or hole 288 and transmits to microprocessor 70 a signal which translates the signal into label position identifying information. For example, if it is sensor 292-4 that detects locator 288 at the beginning of a run as shown in FIG. 14, microprocessor will know that the terminal digit label applied to the next file folder 30 processed through labelling station 262 will bear the terminal number 43.

As in the previously discussed labelling machines, label folders discharged from labelling station 262—such as those identified by reference characters 30w. . . 30aa—are preferably shingled on the takeaway conveyor (not shown) to facilitate visual inspection of those folders.

Part of a set of completely labelled file folders destined for a terminal digit filing system is illustrated in FIG. 15 and identified by reference character 298. In this case, all of the illustrated file folders 30bb. . . 30ii bear labels 3 and 4 which identify a particular terminal digit file section, drawer, etc. numbered 34 and, to that extent, are identically labelled. However, these folders are destined for different files in section or drawer 34. The several files in the drawer, section, etc. numbered 34 are differentiated among by the two labels 300 and 302 applied to each of the file folders. Thus: one file folder labelled 34 by these two labels is coded by labels 300 and 302 for file 00 in drawer or section 34; a second folder also labelled 34 is coded for file 01 in the same section; another file folder labelled 34 is coded for file 11 in that section; etc.

Additional stations can of course be employed to add to file folders like those shown in FIG. 15 classification bands, year labels, bar code labels, etc.

The invention may be embodied in many forms in addition to those disclosed herein without departing from the spirit or essential characteristics of the invention. The present embodiments are therefore to be considered in all respects as illustrative and not restrictive, the scope of the invention being indicated by the appended claims rather than by the foregoing description. All changes which come within the meaning and range of equivalency of the claims are intended to be embraced therein.

What is claimed is:

1. Apparatus for applying a set of labels to an artifact, said apparatus comprising plural work stations and each work station including:
   label supply means with multiple supplies of labels available for application to said artifact at that station;
   means for so manipulating the label supply means as to align the supply of a particular label at a selected location along the artifact where the label is to be applied;
   means for advancing said artifact to and through the station;
   label removing and positioning means for separating a label from the aligned label supply and positioning said label for application to the selected location on the artifact; and
   means for transferring the label to the artifact and affixing it to said artifact as the artifact is advanced through the work station.

2. Apparatus as defined in claim 1:
   in which the label supply means of each of the plural work stations comprises a carriage and rolls of labels in side-by-side relationship on said carriage; and
   which includes means for so shifting said carriage as to align a selected one of the rolls of labels with a particular spot on an artifact being labelled where that label is to be attached.

3. Apparatus as defined in claim 2 which includes operator controllable means for shifting the label supply means carriage at any one of the plural work stations independently of the shifting of the label supply means carriage at any other of the plural work stations.

4. Apparatus as defined in claim 2 in which:
   the label supply means at each work station comprises strings of labels adhered to a backing; and
   the means for separating a label from an aligned label supply for positioning and application to an artifact to be labelled comprises, at each work station, means for advancing the backing of the aligned label supply and the labels adhered to that backing and means for separating the next available label from said backing as it is advanced.

5. Apparatus as defined in claim 1 in which:
   the label supplies at the plural work stations each comprise a string of labels detachably adhered to a backing; and
   the means for positioning a label removed from an aligned label supply comprises, at each work station: a label contactable means with an upstream side and a passage through which the artifact being processed at that work station can pass as it is advanced through the work station and means for detachably adhering the label separated from said backing to the upstream side of the label contactable means and across said passage.

6. Apparatus as defined in claim 1 which comprises:
means at each of the plural work stations for halting the artifact being labelled at that work station in front of the work station's label removing and positioning means as the artifact is advanced;
means for detecting a label positioned for application to the selected location on the artifact; and
means responsive to the detection of a thus positioned label which allows the artifact to then proceed through the work station.

7. Apparatus as defined in claim 1 which comprises, at each of the plural work stations:
means for advancing an artifact to be labelled to and through said work station;
an elongated guide extending in the direction of movement of the artifact; and
means for biasing the artifact against the guide and thereby accurately positioning the artifact for application of a label to said artifact at the selected location therealong.

8. Apparatus as defined in claim 1 which includes a takeaway conveyor that shingles labelled artifacts exiting from the last of the plural work stations and thereby facilitates the visual inspection of the labelled artifacts.

9. Apparatus as defined in claim 1 in which includes a programmable computer for selecting those labels to be applied to a given artifact as it proceeds through the different ones of the plural work stations.

10. Apparatus as defined in claim 9 in which the programmable computer includes means for so controlling the functioning and operation of the plural work stations that selected labels can concomitantly be applied to different artifacts at the several ones of those work stations.

11. Apparatus as defined in claim 10 which includes:
means for advancing the different ones of said artifacts to the different ones of said plural work stations; and
means for coordinating: the movement of artifacts to and through the work stations and the shifting of appropriate label supplies into alignment with different label receiving areas on those several artifacts at the work stations.

12. Labelling apparatus comprising:
plural work stations, each including: label supply means, means for advancing an artifact to be labelled to and through the station, means for separating a label from the label supply means and positioning said label for application to a selected location on the artifact, and means for transferring the label to the artifact and affixing it to said artifact as the artifact is advanced through the work station;
the label supply means at one or more of said work stations being of a first type having multiple supplies of labels available for application to said artifact at that work station and means for so manipulating the label supply means as to align the supply of a particular label with the selected location on an artifact being labelled at that work station where the label is to be applied; and
at least one remaining work station of a second type having a label supply means with a label supply so fixedly positioned after setting up the apparatus that the labels thereof can be applied at only one artifact location.

13. Apparatus as defined in claim 12 in which both the first and second type work station(s) have:
label supply means comprising a label roll which has a string of labels attached seriatim to a backing, one side of each label being adhesively faced; and
a label positioning means with a passage through which an artifact to be labelled can pass as the artifact is advanced to and through the work station; and
means for separating a label from said backing and temporarily affixing said label to an upstream face of the positioning means with the adhesively faced side of the label exposed and the label overlying the passage through the positioning means;
the passage through the label positioning means being so dimensioned that: the label temporarily affixed to said label positioning means is engaged by the leading edge of the artifact being labelled as it advances through said passage and adjoining segments of the label are bent toward opposite sides of the artifact with the adhesively faced side of the label facing the artifact.

14. Apparatus as defined in claim 13 which comprises means at the first and second type work station(s) for pressing the segments of labels there affixed to the artifacts being labelled against said artifacts after the leading edge of the artifact exits from said passage to firmly attach the label thereto.

15. Apparatus as defined in claim 12 in which the label supply means at the second type work stations each include:
at least one roll of labels; and
a stationary support for said roll of labels.

16. Apparatus as defined in claim 12:
in which the label supply means at each of the first type work stations comprises a carriage and rolls of labels in side-by-side relationship on said carriage; and
which includes means for so shifting the carriage at each work station as to align a selected one of the rolls of labels with a particular spot on an artifact being labelled and thereby allow a label in said selected roll to be attached to the artifact at that spot.

17. Apparatus as defined in claim 16 in which the means for shifting said supply means carriage at each of the first type work stations across the artifact being labelled at that work station includes a rotatable ball bearing screw oriented at right angles to the direction of movement of artifacts through the work station, said carriage being so connected to said ball bearing screw for movement therealong as said screw is rotated.

18. Apparatus as defined in claim 12 which includes:
at least two first type work stations and operator controllable means for so independently and concomitantly shifting the label supply means carriage at all of the first type work stations that independently selected labels can concomitantly be applied to different artifacts at the first type work stations.

19. Apparatus as defined in claim 12 in which the means for separating labels from their elongated backings at both the first and second type work station(s) comprise: means for advancing a label supply at each of said work stations and means for peeling the next available label from the backing of the label supply as said supply is advanced.

20. Apparatus as defined in claim 12 in which the means for positioning a label removed from an aligned label supply at the first and second type work station(s) comprises: a label contactable means with an upstream face and a passage through which an artifact being labelled can pass as it is advanced through the work station and means for temporarily adhering a label separated from its backing to the upstream side of the label contactable means and across said passage.

21. Apparatus as defined in claim 12 which comprises, at the first and second type work stations:
means for halting an artifact being labelled at the work station as that artifact is advanced;
means for detecting a label positioned for application to the selected location on the artifact; and
means responsive to the detection of a properly positioned label which allows the artifact to proceed through the work station.

22. Apparatus as defined in claim 12 which comprises:
means for advancing an artifact to be labelled to and through each of said work stations;
an elongated guide on the upstream side of each work station label positioning means, said guide extending in the direction of movement of the artifact being labelled through the work station; and
means for biasing the artifact being labelled against the guide at each said work station and thereby accurately positioning the artifact for application of a label in the proper location to the artifact at that work station.

23. Apparatus as defined in claim 12 which includes a takeaway conveyor that shingles labelled artifacts exiting from the last of the work stations and thereby facilitates the visual inspection of the labelled artifacts.

24. Apparatus as defined in claim 12 which includes a programmable computer for controlling the concomitant application of selected labels to different artifacts at the several work stations.

25. Apparatus as defined in claim 12:
in which the label supply at a first type work station includes a string of labels adhered to a backing; and
which comprises means for identifying labels of the label supply at said first type work station by their location relative to the means by which they are separated, from their backing.

26. Apparatus as defined in claim 12 which has:
at least two first type work stations; and
means for coordinating: the movement of artifacts to be labelled to and through the first type work stations and the independent shifting of appropriate label supplies into alignment with different label receiving areas on artifacts being concomitantly labelled at the first type work stations.

27. A method of applying a set of selected labels to a leading edge portion of an artifact to be labelled, said method comprising the steps of:
at each of a plurality of serially arranged work stations, providing an integrated structure supporting a set of label rolls, each having a backing and multiple, adhesive labels on said backing;
advancing the artifact to be labelled in turn to, and through, each of said work stations; and,
at each of the work stations:
shifting the integrated structure as, and if, necessary to align a particular roll with a designated area on the artifact being labelled;
peeling a label from the backing strip of said particular roll and temporarily affixing the label to a means which holds the label in an appropriate position relative to the designated area of the artifact being labelled; and thereafter
transferring the label from the label positioning means to the artifact.

28. A method as defined in claim 27 in which a programmable computer is employed in aligning the label roll having the selected label with the position on the artifact being labelled where that label is to be applied, thereby making it possible to select on an artifact-to-artifact basis the label to be applied to a given artifact at each of said work stations.

29. Apparatus for labelling an artifact, said apparatus comprising a work station with:
label supply means comprising a carriage and rolls of labels in side-by-side relationship on said carriage, each roll of labels having a string of labels attached seriatim to a backing and one side of each label being adhesively faced;
means for so shifting said carriage that a selected one of the rolls of labels can be aligned with a particular spot on an artifact being labelled and thereby allow a label in said selected roll to be applied to that spot on the artifact;
means for advancing the artifact along a path to and through the work station;
means for so manipulating a selected one of the rolls of labels as to advance the next available label on the backing of that strip to the label separating means, the means for manipulating the selected roll of labels comprising guide means for confining the assemblage of backing and labels to the path between the roll of labels and the label positioning means and said guide means comprising a set of idler roller segments arranged in side-by-side relationship and equalling in number the rolls of labels and spacers of greater diameter than said rollers between adjacent ones of the segments;
a stationary label positioning means for positioning the label, said label positioning means having a passage through which the artifact to be labelled can pass as the artifact is advanced to and through the work station, said passage lying along said path and said label positioning means having components on both sides of and extending from said path;
means for separating a label from said backing and temporarily affixing said label to the upstream sides of said components of the label positioning means with the adhesively faced side of the label exposed and the label overlying the passage through the label positioning means;
the passage through the label positioning means being so dimensioned that: (a) a label temporarily affixed to said label positioning means is engaged by the leading edge of the artifact as the artifact advances through said passage, and (b) adjoining segments of the label are bent toward opposite sides of the artifact with the adhesively faced sides of the label facing the artifact.

30. Apparatus for labelling an artifact, said apparatus comprising a work station with:
label supply means comprising a carriage and rolls of labels in side-by-side relationship on said carriage, each roll of labels having a string of labels attached seriatim to a backing and one side of each label being adhesively faced;

means for so shifting said label supply means carriage that a selected one of the rolls of labels can be aligned with a particular spot on an artifact being labelled and thereby allow a label in said selected roll to be applied to that spot on the artifact, the means for shifting said supply means carriage across the artifact being labelled including a rotatable ball bearing screw oriented at right angles to the direction of movement of the artifact being labelled through the work station, said carriage being mounted on said ball bearing screw for movement therealong as said screw is rotated;

means for advancing the artifact along a path to and through the work station;

a stationary label positioning means for positioning the label, said label positioning means having a passage through which the artifact to be labelled can pass as the artifact is advanced to and through the work station, said passage lying along said path and said label positioning means having components on both sides of and extending from said path;

means for separating a label from said backing and temporarily affixing said label to the upstream sides of said components of the label positioning means with the adhesively faced side of the label exposed and the label overlying the passage through the label positioning means; and the passage through the label positioning means being so dimensioned that: (a) a label temporarily affixed to laid label positioning means is engaged by the leading edge of the artifact as the artifact advances through said pad,age, and (b) adjoining segments of the label are bent toward opposite sides of the artifact with the adhesively faced sides of the label facing the artifact.

31. Apparatus for labelling an artifact, said apparatus comprising a work station with:

label supply means comprising a carriage and rolls of labels in side-by-side relationship on said carriage, each roll of labels having a string of labels attached seriatim to a backing and one side of each label being adhesively faced;

operator controllable means for so shifting said label supply means carriage that a selected one of the rolls of labels can be aligned with a particular spot on an artifact being labelled and thereby allow a label in said selected roll to be applied to that spot on the artifact;

means for advancing the artifact along a path to and through the work station;

a stationary label positioning means for positioning the label, said label positioning means having a passage through which the artifact to be labelled can pass as the artifact is advanced to and through the work station, said passage lying along said path and said label positioning means having components on both sides of and extending from said path;

means for separating a label from said backing and temporarily affixing said label to the upstream sides of said components of the label positioning means with the adhesively faced side of the label exposed and the label overlying the passage through the label positioning means; and the passage through the label positioning means being so dimensioned that: (a) a label temporarily affixed to said label positioning means is engaged by the leading edge of the artifact as the artifact advances through said passage, and (b) adjoining segments of the label are bent toward opposite sides of the artifact with the adhesively faced side of the label facing the artifact.

* * * * *